United States Patent
Andersson et al.

(10) Patent No.: US 10,610,431 B2
(45) Date of Patent: Apr. 7, 2020

(54) LIFT SYSTEM WITH LOWERING MECHANISM

(71) Applicant: Liko Research & Development AB, Lulea (SE)

(72) Inventors: Mattias Andersson, Sodra Sunderbyn (SE); Roger Karlsson, Rosvik (SE); Andreas Gelfgren, Lulea (SE)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 764 days.

(21) Appl. No.: 15/230,794

(22) Filed: Aug. 8, 2016

(65) Prior Publication Data
US 2016/0338895 A1 Nov. 24, 2016

Related U.S. Application Data

(63) Continuation of application No. 13/914,023, filed on Jun. 10, 2013, now Pat. No. 9,408,765.
(Continued)

(51) Int. Cl.
*A61G 7/10* (2006.01)
*A61G 7/14* (2006.01)
(Continued)

(52) U.S. Cl.
CPC .......... *A61G 7/1065* (2013.01); *A61G 7/108* (2013.01); *A61G 7/1015* (2013.01);
(Continued)

(58) Field of Classification Search
CPC .. A61G 7/1013; A61G 7/1015; A61G 7/1042; A61G 7/1049; A61G 7/1051; A61G 7/1063; A61G 71/065; A61G 7/1065
(Continued)

(56) References Cited

U.S. PATENT DOCUMENTS 3,666,239 A  5/1972  Koshihara
3,977,652 A  8/1976  Mauch
(Continued)

FOREIGN PATENT DOCUMENTS

EP  1027024 A1  8/2000
SE  429296 B   8/1983
SE  502266 C2  9/1995

OTHER PUBLICATIONS

European Search Report dated Sep. 19, 2013 for European Patent Application No. 13171305.9.
(Continued)

*Primary Examiner* — Robert G Santos
(74) *Attorney, Agent, or Firm* — Dinsmore & Shohl LLP

(57) ABSTRACT

A movement system for use with an overhead patient lift system includes a motor. A drum is operatively coupled to the motor. The drum is configured to be selectively driven by the motor to rotate in one of a clockwise direction and a counter-clockwise direction. A lifting strap is coupled to the drum. The lifting strap is extendable and retractable with respect to a carriage of the overhead patient lifting system as the drum rotates. A manual release operatively coupled to the drum is actuatable to selectively disengage the drum from the motor to allow the lifting strap to be manually extended. Also disclosed is an overhead patient lift system including the movement system and a method for manually extending a lifting strap of an overhead patient lift system.

7 Claims, 20 Drawing Sheets

Related U.S. Application Data

(60) Provisional application No. 61/736,954, filed on Dec. 13, 2012, provisional application No. 61/657,743, filed on Jun. 9, 2012.

(51) Int. Cl.
  *F16D 13/12* (2006.01)
  *G06F 11/30* (2006.01)

(52) U.S. Cl.
  CPC ......... *A61G 7/1042* (2013.01); *A61G 7/1051* (2013.01); *F16D 13/12* (2013.01); *G06F 11/30* (2013.01); *A61G 7/1013* (2013.01); *A61G 7/1049* (2013.01); *A61G 2203/20* (2013.01)

(58) Field of Classification Search
  USPC ................ 5/85.1, 81.1 R, 83.1, 88.1, 89.1
  See application file for complete search history.

(56) References Cited

U.S. PATENT DOCUMENTS

| | | | |
|---|---|---|---|
| 4,372,452 A | 2/1983 | McCord | |
| 5,573,091 A | 11/1996 | Hung | |
| 5,794,880 A | 8/1998 | Liljedahl | |
| 5,871,069 A | 2/1999 | Carmitchel | |
| 6,085,368 A | 7/2000 | Robert et al. | |
| 8,474,794 B2 * | 7/2013 | Liljedahl | A61G 7/1017 254/120 |
| 8,494,794 B2 * | 7/2013 | Dutta | A61B 5/0538 702/65 |
| 8,538,710 B2 * | 9/2013 | Todd | A61G 7/1065 702/63 |
| 9,408,765 B2 * | 8/2016 | Andersson | A61G 7/1015 |
| 9,527,699 B2 * | 12/2016 | Liljedahl | A61G 7/1017 |
| 9,561,147 B2 * | 2/2017 | Todd | A61G 7/1065 |
| 10,322,046 B2 * | 6/2019 | Liljedahl | A61G 7/1017 |
| 10,376,434 B2 * | 8/2019 | Andersson | |
| 10,420,690 B2 * | 9/2019 | Dixon | A61G 7/1051 |
| 10,478,360 B2 * | 11/2019 | Andersson | A61G 7/10 |
| 10,478,361 B2 * | 11/2019 | Harmeyer | A61G 7/10 |
| 2010/0224841 A1 | 9/2010 | Liljedahl | |
| 2011/0082655 A1 | 4/2011 | Todd et al. | |
| 2011/0100249 A1 | 5/2011 | Ipsen | |
| 2011/0166826 A1 * | 7/2011 | Jensen | A61G 7/05 702/177 |
| 2013/0168622 A1 * | 7/2013 | Liljedahl | A61G 7/1017 254/8 R |
| 2014/0013503 A1 * | 1/2014 | Dixon | A61G 7/1073 5/85.1 |
| 2014/0020175 A1 * | 1/2014 | Dixon | A61G 7/1073 5/85.1 |
| 2014/0055122 A1 * | 2/2014 | Todd | A61G 7/1065 324/71.1 |
| 2014/0075669 A1 | 3/2014 | Andersson et al. | |
| 2016/0338895 A1 * | 11/2016 | Andersson | A61G 7/1015 |
| 2017/0000672 A1 * | 1/2017 | Andersson | A61G 7/1017 |
| 2017/0000673 A1 * | 1/2017 | Harmeyer | A61G 7/1017 |
| 2017/0027794 A1 * | 2/2017 | Andersson | G01G 19/44 |
| 2017/0071807 A1 * | 3/2017 | Liljedahl | A61G 7/1017 |
| 2019/0247255 A1 * | 8/2019 | Liljedahl | A61G 7/10 |
| 2019/0314234 A1 * | 10/2019 | Andersson | A61G 7/1017 |

OTHER PUBLICATIONS

European Search report dated Aug. 25, 2015 for European Patent Application No. 15176291.1.

\* cited by examiner

LIFT SYSTEM WITH LOWERING MECHANISM

BACKGROUND

The subject matter disclosed herein relates generally to lift systems with lowering mechanisms and, more particularly, but not exclusively, to an overhead patient lift system operatively coupled to a rail secured on a support surface, such as a ceiling, with a movement system that allows a user to manually lower a lifting strap.

Caregivers may need to move patients from one location to another in a care facility. Sometimes, caregivers use lift systems to assist with lifting and/or moving a patient. While various lift systems have been developed, there is still room for improvement. Thus, a need persists for further contributions in this area of technology.

SUMMARY

In one aspect, a movement system for use with an overhead patient lift system includes a motor. A drum is operatively coupled to the motor. The drum is configured to be selectively driven by the motor to rotate in one of a clockwise direction and a counter-clockwise direction. A lifting strap is coupled to the drum. The lifting strap is extendable and retractable with respect to a carriage of the overhead patient lifting system as the drum rotates. A manual release operatively coupled to the drum is actuatable to selectively disengage the drum from the motor to allow the lifting strap to be manually extended.

In another aspect, an overhead patient lift system includes a rail coupled to a support surface, a lift unit movably coupled to the rail by a carriage, and a movement system at least partially enclosed with the lift unit. The movement system includes a motor. A drum is operatively coupled to the motor. The drum is configured to be selectively driven by the motor to rotate in one of a clockwise direction and a counter-clockwise direction. A lifting strap is coupled to the drum, and extendable and retractable with respect to a carriage of the overhead patient lifting system as the drum rotates. A manual release is actuatable to selectively disengage the drum from the motor to allow the lifting strap to be manually extended.

In yet another aspect, a method for manually extending a lifting strap of an overhead patient lift system includes actuating a manual release operatively coupled to a drum to selectively disengage the drum from a motor to allow the lifting strap to be manually extended.

In another aspect, a method of monitoring operation of one or more components of an overhead patient lift system includes transmitting electronic data signals, corresponding to the operation of a component of the overhead patient lift system, to a computer in communication with the overhead patient lift system. The electronic data signals corresponding to operation of the component of the overhead patient lift system are received in a processor of the computer and processed by the processor to generate electronic operation data of the component of the overhead patient lift. Processed electronic operation data of the component of the overhead patient lift is stored in a non-transient computer readable storage medium in communication with the computer. The electronic operation data of the component of the overhead patient lift is displayed on a display device in communication with one or more of the computer and the storage medium.

Additional features, which alone or in combination with any other feature(s), such as those listed above and/or those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

Referring now to the illustrative examples in the drawings, wherein like numerals represent the same or similar elements throughout.

DETAILED DESCRIPTION

Figure 1:
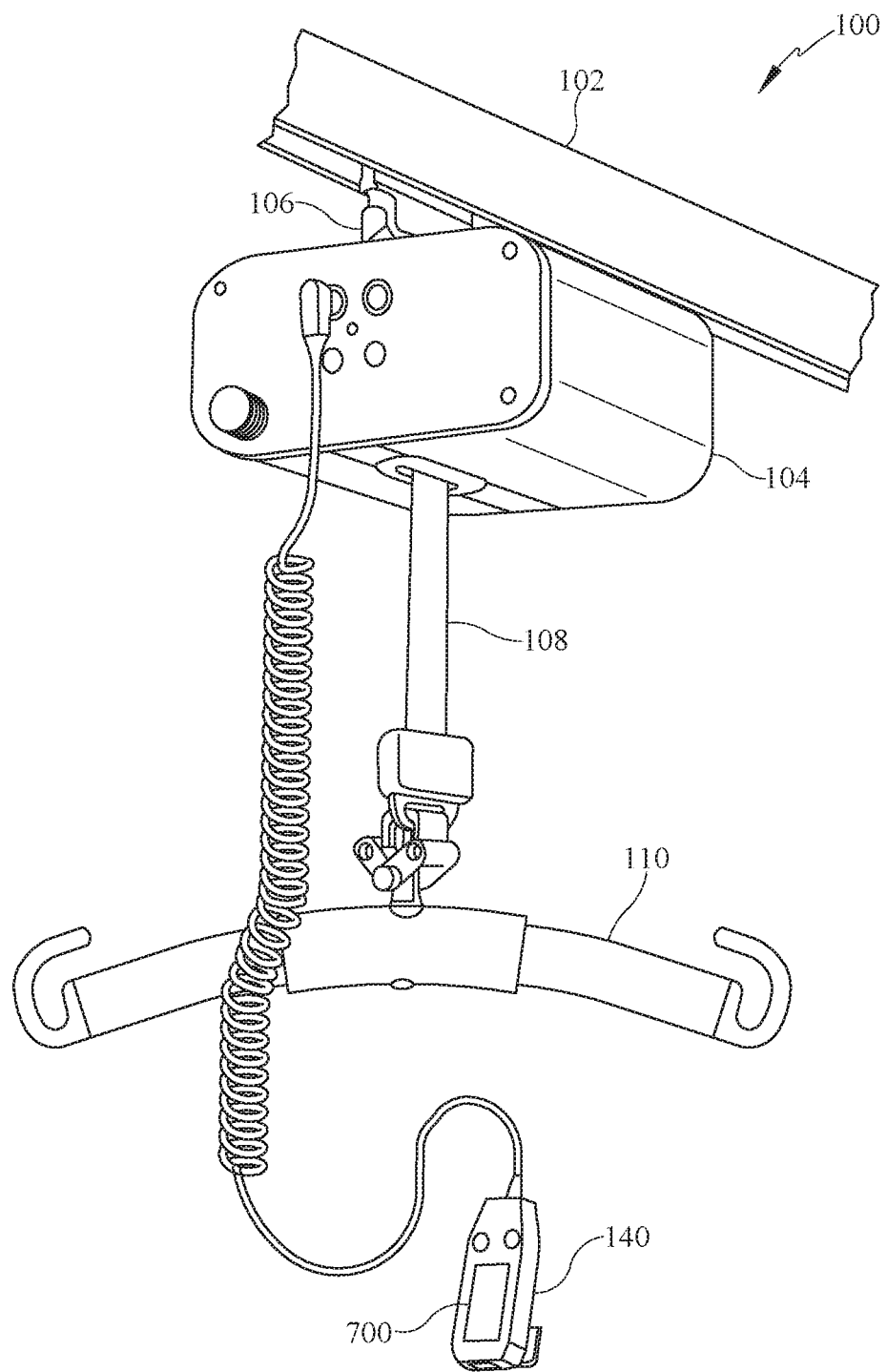
FIG. 1 is a perspective view of an exemplary rail-mounted overhead patient lift system, according to one or more embodiments described herein.

The embodiments described herein relate to an overhead patient lift system operatively coupled to a rail secured on a support surface, such as a ceiling, having a movement system that allows a user to manually lower a lifting strap of the overhead patient lift system. While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

FIG. 1 generally depicts an exemplary overhead patient lift system 100 for lifting and/or moving a patient according to one illustrative embodiment of the disclosure. Overhead patient lift system 100 includes one or more rails 102 that are secured or coupled to a support surface, such as a ceiling of a room, and a lift unit 104 movably coupled to rail 102 by a carriage 106. In this embodiment, lift unit 104 is configured to support and/or lift a patient with a lifting strap 108 having a sling bar 110 or another suitable accessory attached to a free end of lifting strap 108. In some contemplated embodiments, a sling or harness (not shown), or another suitable apparatus for supporting the patient, is coupled to sling bar 110. More specifically, in one embodiment, with sling bar 110 coupled to lifting strap 108, a sling is coupled to sling bar 110 and configured to support the patient positioned within the sling to facilitate the lifting operation. Lifting strap 108 is operatively coupled to a movement system 120 contained within lift unit 104.

Figure 2:
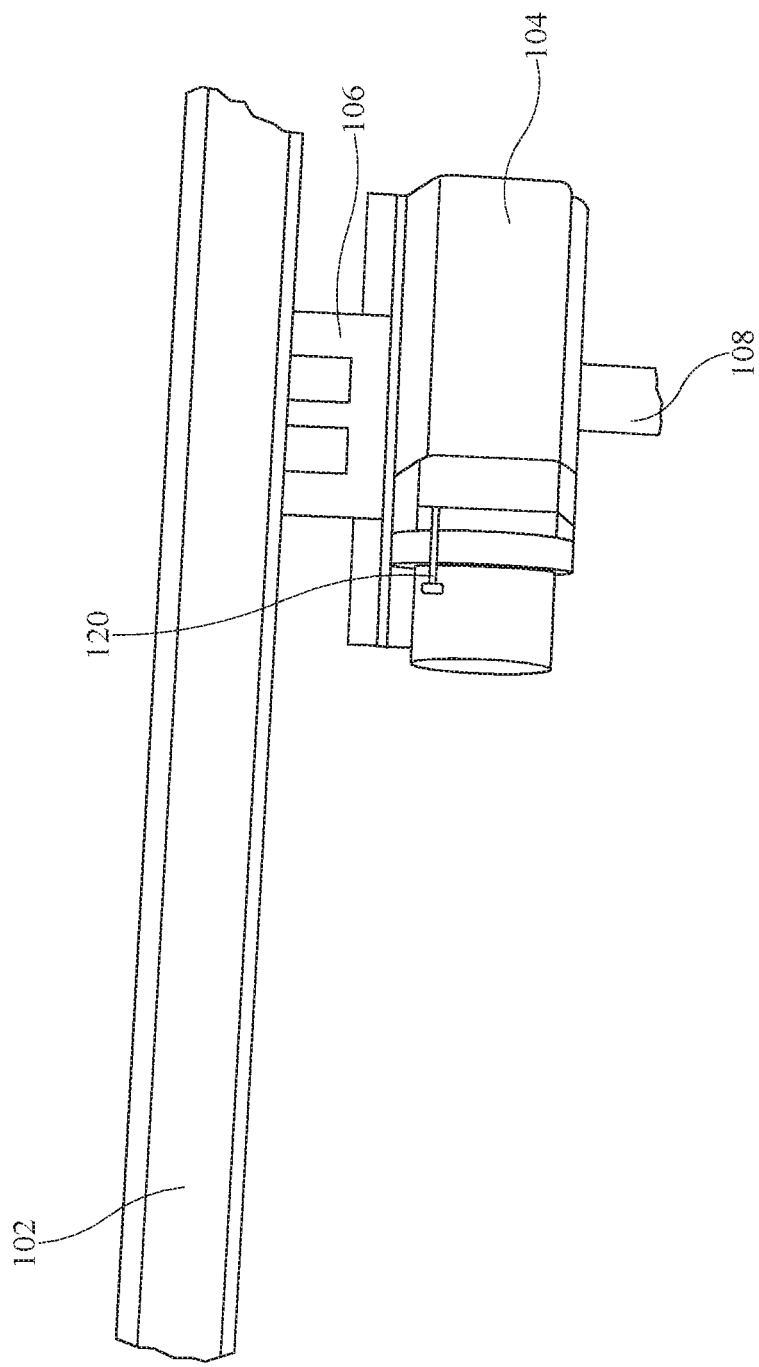
FIG. 2 is a perspective side view the rail-mounted overhead patient lift system of FIG. 1, showing a lift unit according to one embodiment described herein.
Figure 3:
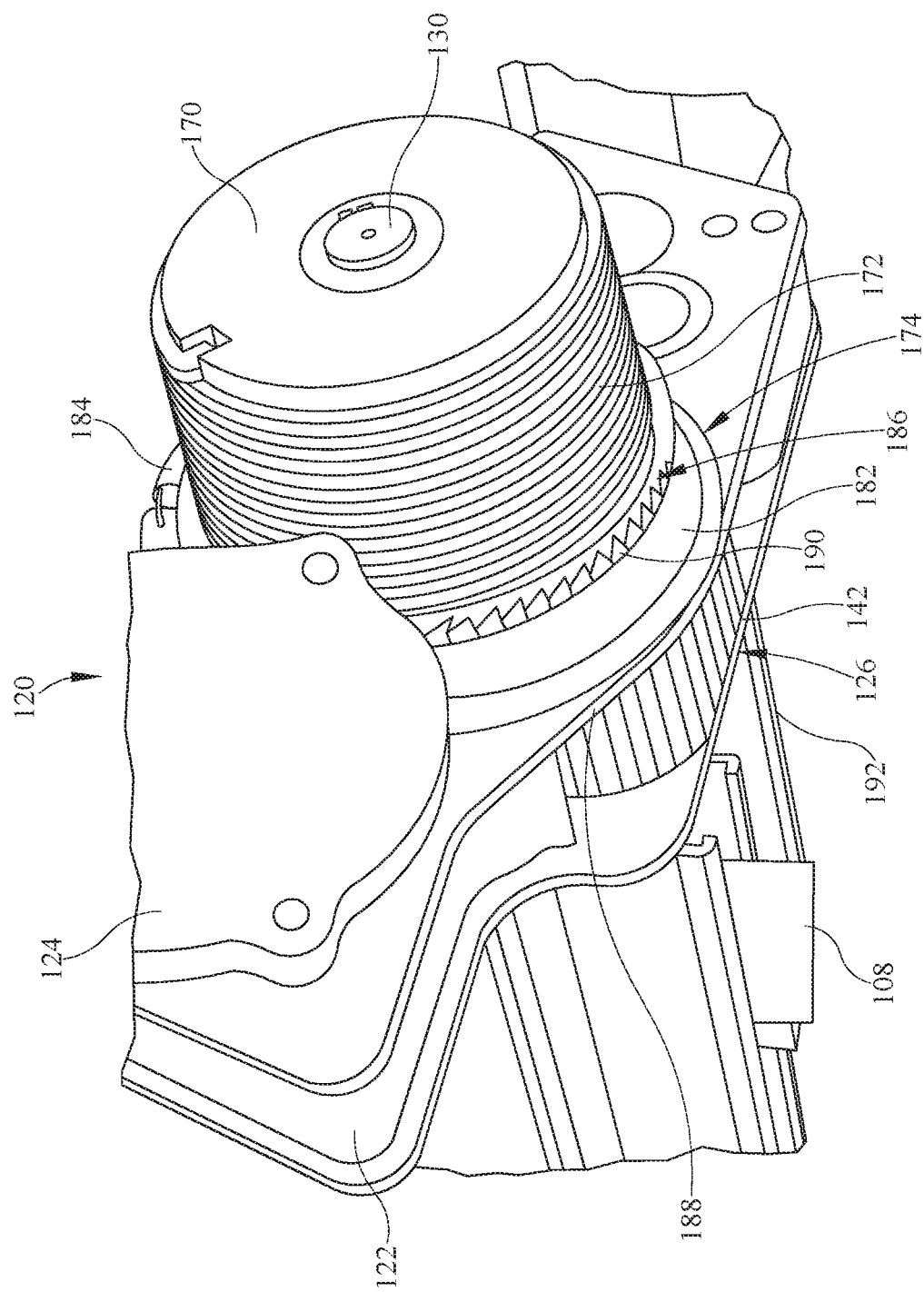
FIG. 3 is a perspective side view of a movement system of the lift unit of FIG. 2.
Figure 4:
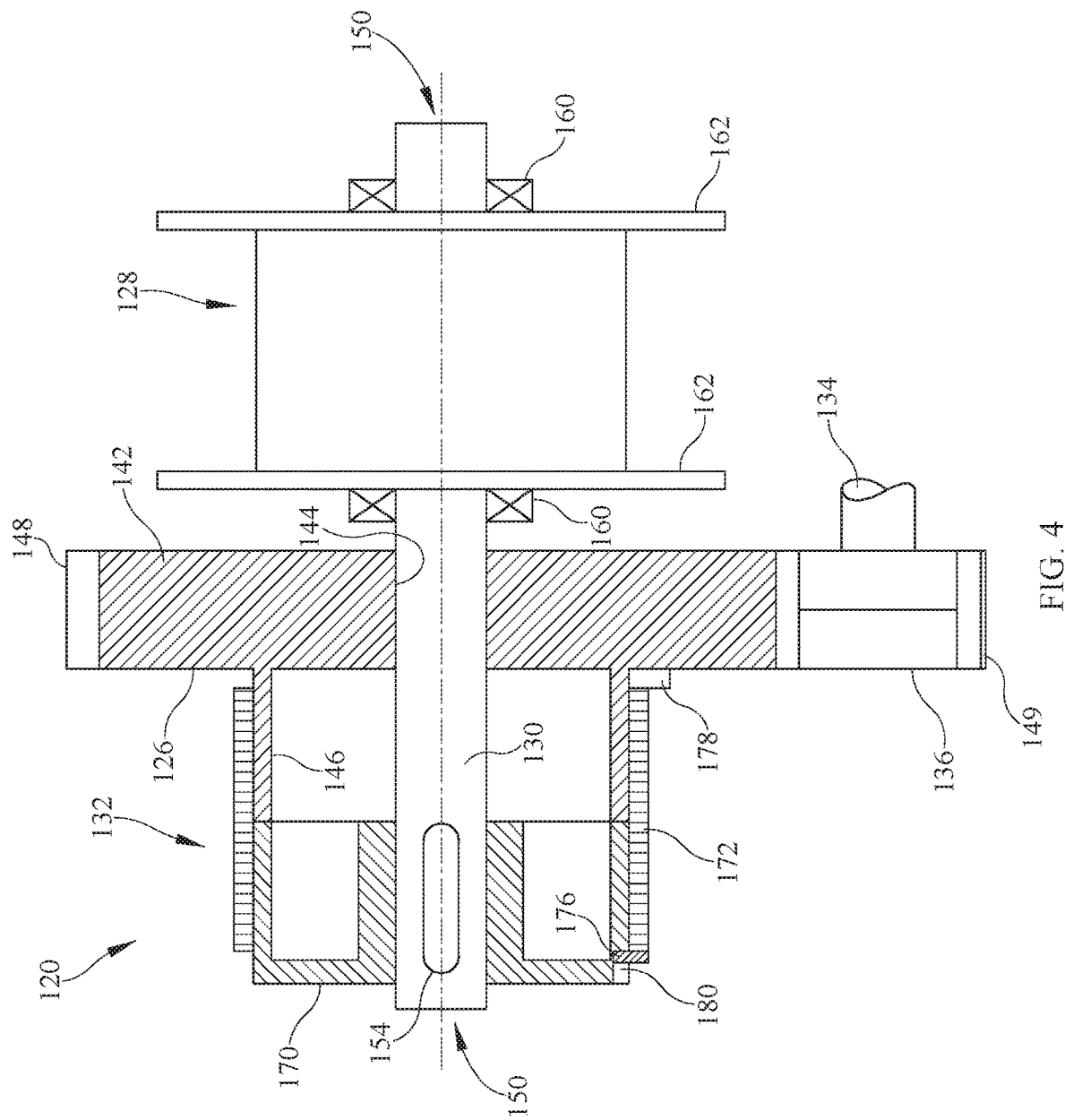
FIG. 4 is a partial sectional side view of a portion of the movement system of FIG. 2.

Referring further to FIGS. 2-4, movement system 120 is supported on one or more mounting plates 122 to facilitate coupling movement system 120 to lift unit 104. Movement system 120 includes a motor 124, a gear wheel 126, a drum 128, a shaft 130, and a brake or clutch system 132. In one embodiment, gear wheel 126 is coupled to drum 128 through brake hub 146, control hub 170 (described below), wrap spring 172 (described below), and shaft 130. In this embodiment, gear wheel 126 is not directly connected to shaft 130 and is able to rotate with respect to shaft 130. In alternative embodiments, gear wheel 126 and drum 128 are coupled to shaft 130 to rotate with shaft 130 as shaft 130 is driven by motor 124. Motor 124 includes a motor shaft 134 and a motor gear 136, as shown in FIG. 4, configured to engage gear wheel 126. Motor shaft 134 passes through an opening (not shown in FIGS. 1-4) in mounting plates 122 to couple with motor gear 136 positioned between mounting plates 122. In this embodiment, motor gear 136 is coupled to motor shaft 134 to rotate with motor shaft 134 as motor shaft 134 is driven by motor 124. Motor gear 136 meshes with or is otherwise operatively coupled to gear wheel 126 such that as motor gear 136 rotates with motor shaft 134, the rotation of motor gear 136 causes gear wheel 126 to rotate. As gear wheel 126 rotates, shaft 130 and drum 128 rotate and lifting strap 108 is paid-out or taken-up (i.e., extended or retracted, respectively) in order to lower or raise the patient supported by a lifting device, such as a sling, attached to lifting strap 108. Motor 124 receives power from a battery (not shown) positioned within lift unit 104, for example. In one embodiment, motor 124 is controlled with a hand-held control 140 directly wired to lift unit 104. In alternative embodiments, hand-held control 140 is wirelessly coupled to lift unit 104. Also, in some contemplated embodiments, lift unit 104 may be constructed so that motor 124 is electrically coupled to conductors (not shown) located in, at or near rail 102.

In the embodiment shown in FIG. 4, gear wheel 126 is positioned between mounting plates 122 (not shown in FIG. 4 to provide clarity) and includes a first or motor engaging portion 142, a shaft opening 144, and a second or brake engaging portion or brake hub 146. As shown in FIG. 4, brake hub 146 is integrated with or formed as one piece with gear wheel 126; however, in an alternative embodiment, brake hub 146 is a separate piece that is coupled to gear wheel 126 using a suitable fastener, such as one or more screws or bolts. Motor engaging portion 142 includes gear teeth 148 that engage gear teeth 149 on motor gear 136.

Shaft opening 144 is generally concentrically aligned with motor engaging portion 142 and brake hub 146 and allows shaft 130 to pass therethrough and rotate with respect to gear wheel 126. Brake hub 146 has a diameter smaller than a diameter of motor engaging portion 142 and extends from motor engaging portion 142 through an opening in mounting plate 122. Brake hub 146 is generally cylindrical in shape and is configured to engage or operatively couple to brake system 132.

Shaft 130 extends through shaft opening 144 in gear wheel 126 and the opening in mounting plate 122. Shaft 130 has a first end 150, an opposing second end 152, and a key slot 154 defined within or at first end 150. Brake system 132 is operatively coupled at or near first end 150 and drum 128 is operatively coupled, such as directly coupled, at second end 152. In this embodiment, brake system 132 is actuatable to stop and/or prevent the rotation of shaft 130 and drum 128. In some contemplated embodiments, second end 152 is coupled to a mounting structure (not shown) to provide additional support for drum 128 positioned between mounting plate 122 and the mounting structure.

Drum 128 is separated from mounting plates 122 by bearings 160 and is configured to rotate in a clockwise or counter-clockwise rotational direction to extend or retract lifting strap 108. Drum 128 is generally cylindrical in shape and includes a pair of retaining flanges 162 at opposing ends of drum 128, as shown in FIG. 4. Lifting strap 108 is wound around drum 128 between flanges 162 which help maintain lifting strap 108 on drum 128 as drum 128 rotates to extend or retract lifting strap 108.

Referring further to FIGS. 3 and 4, brake system 132 includes a control hub 170, a wrap spring 172 position about at least a portion of control hub 170 and at least a portion of brake hub 146, and an actuation mechanism 174. Control hub 170 is coupled to shaft 130 by way of key slot 154 and is configured to rotate with shaft 130 and drum 128. Control hub 170 is generally cylindrical and has a diameter substantially equal to the diameter of brake hub 146.

Wrap spring 172 is configured to frictionally engage control hub 170 and brake hub 146 to stop and/or prevent drum 128 from rotating with respect to gear wheel 126 and to allow a user to manually lower lifting strap 108. Wrap spring 172 includes an end tang 176 and a control tang 178. End tang 176 is retained in a slot 180 formed in control hub 170 and control tang 178 is engaged by actuation mechanism 174, shown in FIG. 3. Control tang 178 is configured to engage gear wheel 126 to open wrap spring 172 and expand a diameter of wrap spring 172 in a radial direction with respect to a longitudinal axis of shaft 130 to allow shaft 130, control hub 170, and drum 128 to rotate with respect to gear wheel 126. In this embodiment, wrap spring 172 expands in a radial direction to allow wrap spring 172, control hub 170, shaft 130 and drum 128 to rotate. Because a load on lifting strap 108 is always in the same direction due to gravity, wrap spring 172 is biased toward remaining tight around brake hub 146 and control hub 170 regardless of whether lifting strap 108 is being extended or retracted. Moreover, wrap spring 172 also works as a one-way clutch, preventing torque from being applied in a wrong direction.

Actuation mechanism 174 is actuatable to engage control tang 178 and move control tang 178 to expand wrap spring 172 in the radial direction with respect to the longitudinal axis of shaft 130. With wrap spring 172 expanded, drum 128 is rotatable, along with control hub 170, wrap spring 172, and shaft 130, with respect to gear wheel 126. In this embodiment, as shown in FIG. 3, actuation mechanism 174 includes a ratchet 182, a spring 184, a ratchet wheel 186, and a manual release 188. Manual release 188 is configured to selectively disengage motor 124 from drum 128 to allow lifting strap 108 to be manually extended. In some contemplated embodiments, actuation mechanism 174 includes solenoids and/or other suitable electronic components to move control tang 178 and allow drum 128 to move with respect to gear wheel 126. Ratchet wheel 186 is positioned about brake hub 146 and is coupled to control tang 178. Ratchet wheel 186 includes ramped gear teeth 190 that ratchet 182 engages in one direction to move control tang 178 and allow drum 128 to rotate with respect to gear wheel 126. In one embodiment, ratchet 182 is positioned about ratchet wheel 186 and includes one or more ramped gear teeth (not shown) that are configured to engage gear teeth 190 of ratchet wheel 186 when manual release 188 is actuated. In some contemplated embodiments, manual release 188 includes a cable 192, a rope, or another suitable component that is coupled to ratchet 182 and configured to rotate ratchet 182 about brake hub 146 and with respect to ratchet wheel 186 from a first position to a second position in which ratchet 182 engages ratchet wheel 186 as manual release 188 is pulled or moved by a user. Spring 184 is used to return ratchet 182 to the first position once manual release 188 is released.

In operation, the user pulls on manual release 188 to release control tang 178 and allow lifting strap 108 to be extended. As manual release 188 is pulled, ratchet 182 engages ratchet wheel 186 and rotates ratchet wheel 186 with respect to brake hub 146. The rotation of ratchet wheel 186 engages control tang 178 and moves control tang 178 from a first location on a circumferential surface of brake hub 146 to a second location on the circumferential surface of brake hub 146 different than the first location, causing wrap spring 172 to unwind and expand in the radial direction to allow control hub 170 and drum 128 to rotate with shaft 130 with respect to gear wheel 126. As control hub 170 and drum 128 rotate with shaft 130, slack in wrap spring 172 is taken up and control tang 178 is released, which causes wrap spring 172 to tighten again and stop drum 128 and control hub 170 from rotating with respect to gear wheel 126. In contemplated embodiments, pulling manual release 188 to release control tang 178 results in lifting strap 108 being manually extended 1-8 centimeters (cm) or, more specifically, 2-6 cm, or, even more specifically 3-4 cm, and all subranges therebetween. In a particular embodiment, when manual release 188 is pulled to release control tang 178 lifting strap 108 is manually extended at least 3 cm. When manual release 188 is released, spring 184 urges ratchet 182 back to the first position.

Figure 5:
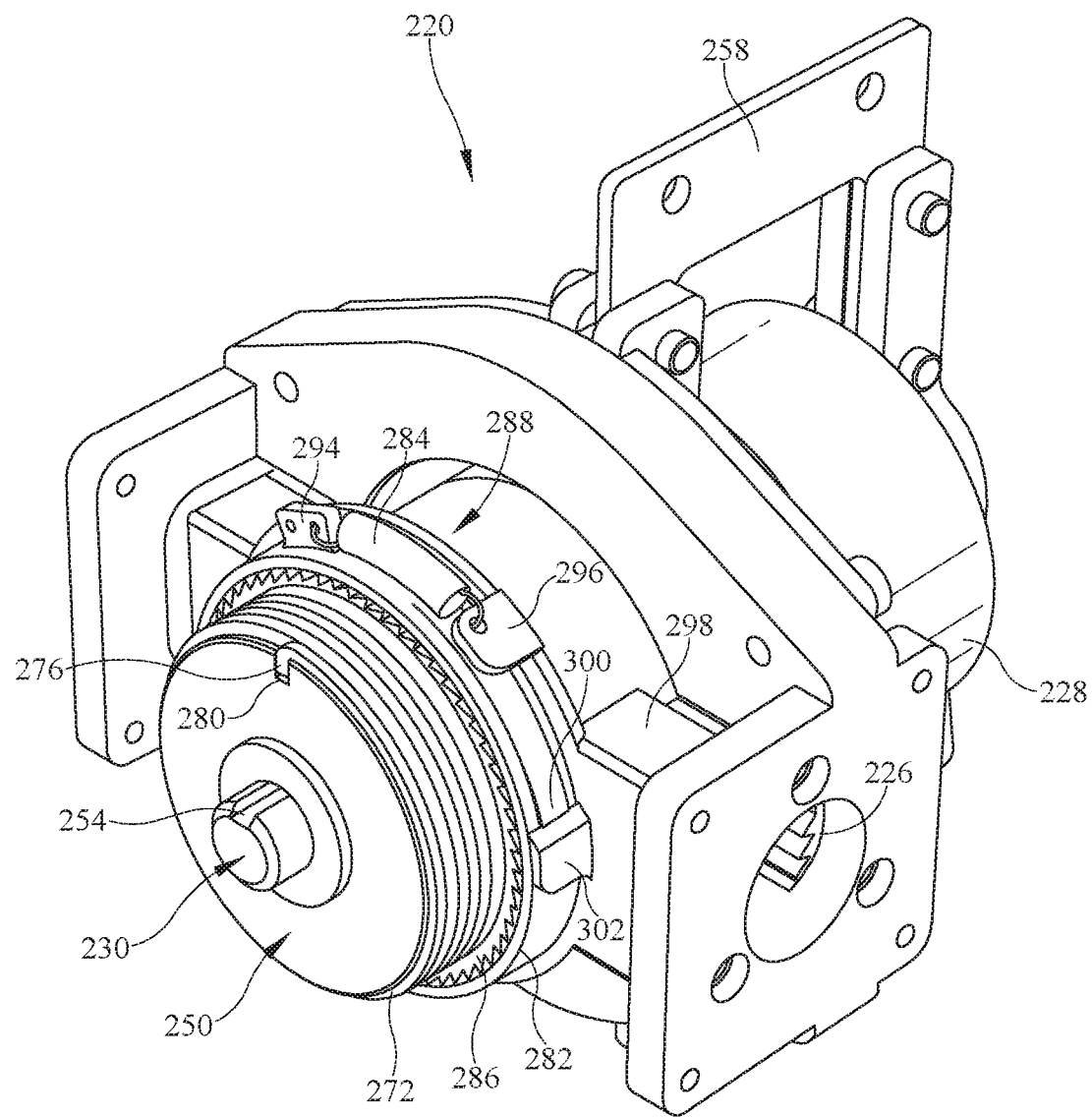
FIG. 5 is a perspective view of an alternative embodiment of a movement system suitable for use with the rail-mounted overhead patient lift system shown in FIG. 1 according to one embodiment described herein.
Figure 6:
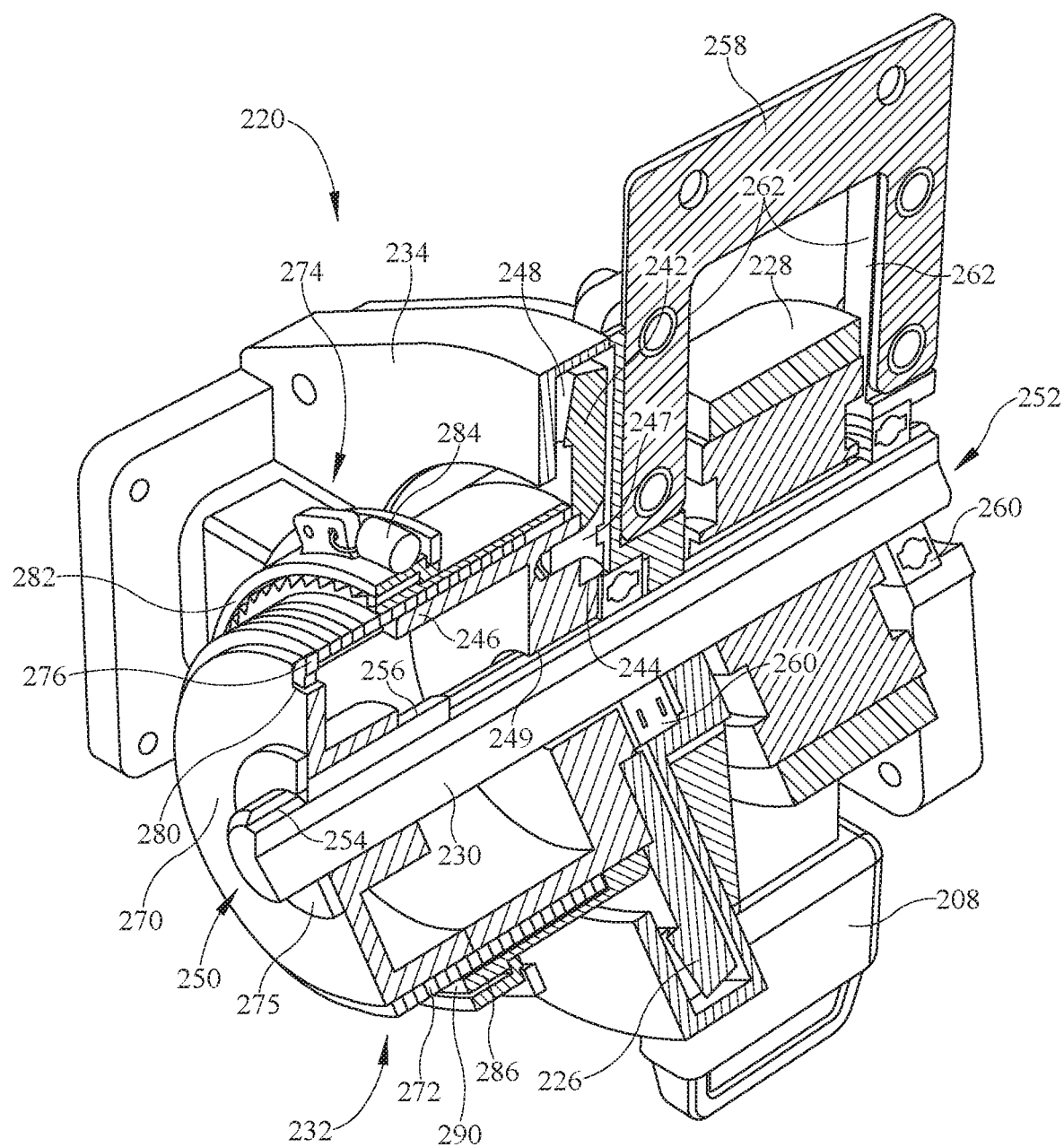
FIG. 6 is a sectional perspective view the movement system of FIG. 5.
Figure 7:
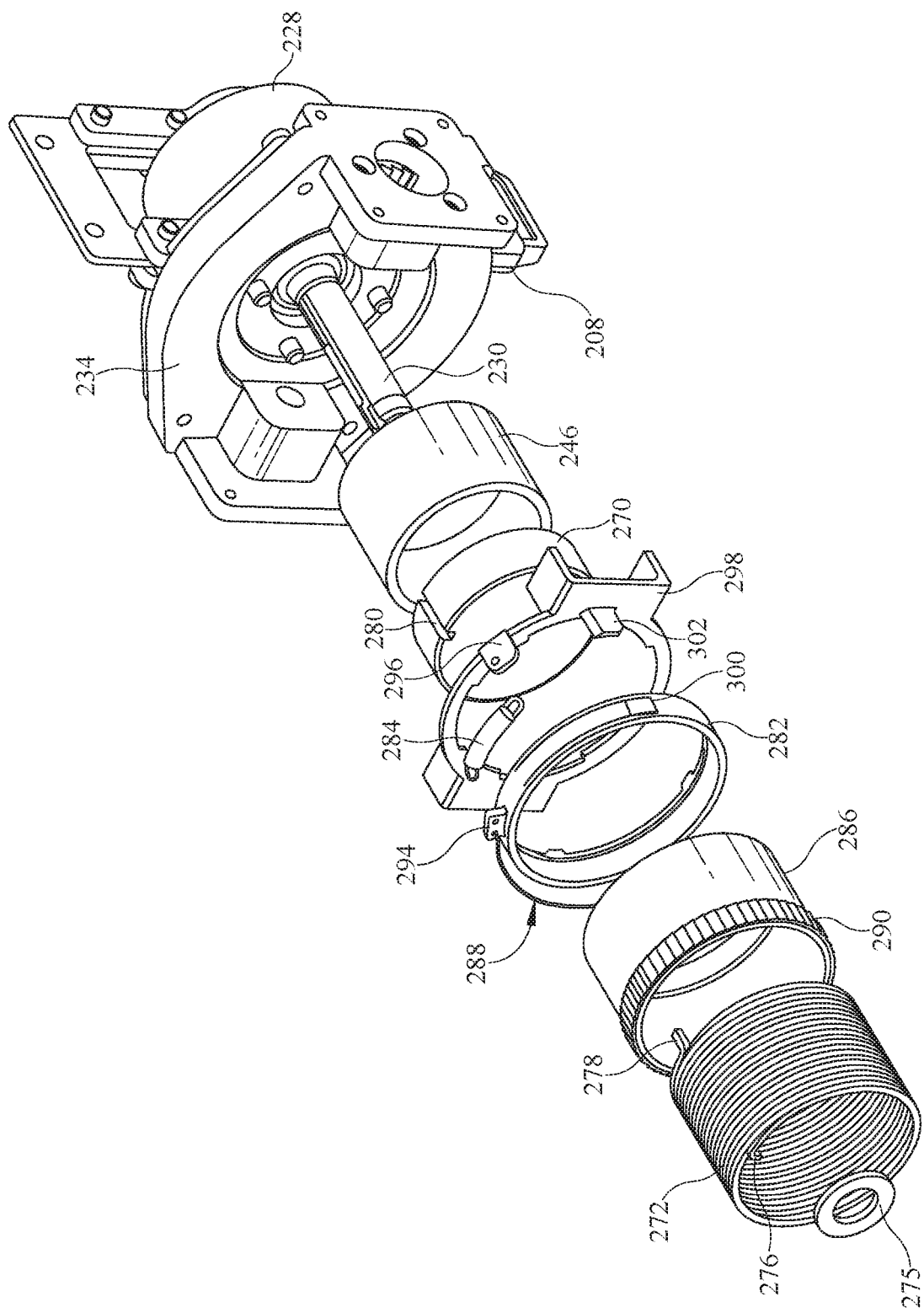
FIG. 7 is an exploded perspective view of the movement system of FIG. 5.

In an exemplary alternative embodiment as shown in FIGS. 5-7, a movement system 220 suitable for use with overhead patient lift system 100 is contained within and supported by lift unit 104 and operatively coupled to lifting strap 108, shown in FIG. 6. Movement system 120 includes a motor, such as motor 124 or another suitable motor, a gear wheel 226 operatively coupled to the motor, a drum 228, a shaft 230, and a brake system 232. In one embodiment, gear wheel 226 and drum 228 are coupled to shaft 230 to rotate with shaft 230 as shaft 230 is driven by the motor. The motor includes a motor shaft and a motor gear coupled to the motor shaft (not shown in FIGS. 5-7) configured to engage gear wheel 226. In a contemplated embodiment, the motor gear meshes with or is otherwise operatively coupled to gear wheel 226 such that as the motor gear rotates with the motor shaft, the rotation of the motor gear causes gear wheel 226 to rotate. As gear wheel 226 rotates, shaft 230 and drum 228 rotate and lifting strap 108 is paid-out or taken-up (i.e., extended or retracted, respectively) in order to lower or raise the patient supported by a lifting device, such as a sling, attached to lifting strap 108.

In the embodiment shown in FIGS. 5-7, gear wheel 226 is positioned within a gear housing 234. Gear wheel 226 includes a motor engaging portion 242 and defines a shaft opening 244. A brake hub 246 is fixedly coupled to gear wheel 226 using one or more suitable fasteners, such as a screw 247 or a bolt. In an alternative embodiment, brake hub 246 is integrated with gear wheel 226. Motor engaging portion 242 includes gear teeth 248 that engage gear teeth on the motor gear. Shaft opening 244 is generally concentrically aligned with motor engaging portion 242 and an opening defined through brake hub 246 to allow shaft 230 to pass therethrough and rotate with respect to gear wheel 226. Brake hub 246 has a diameter smaller than a diameter of motor engaging portion 242 and extends from motor engaging portion 242 through an opening in gear housing 234. Brake hub 246 is generally cylindrical in shape and is configured to engage or operatively couple to brake system 232.

Shaft 230 extends through shaft opening 244 in gear wheel 226 and openings in gear housing 234. Shaft 230 has a first end 250, an opposing second end 252, and a slot 254 defined in shaft 230 extending between first end 250 and second end 252. A projection 256 is positioned within slot 254 at or near first end 250. As shown in FIGS. 5-7, brake system 232 is operatively coupled at or near first end 250 and drum 228 is operatively coupled, such as directly coupled, at second end 252. In this embodiment, brake system 232 is actuatable to stop and/or prevent the rotation of shaft 230. In some contemplated embodiments, second end 252 is coupled to lift unit 104 by one or more brackets 258.

Bearings 260 are positioned about shaft 230 at or near opposing ends of drum 228 to facilitate rotation of shaft 230 and drum 228 in a clockwise or counter-clockwise rotational direction to extend or retract lifting strap 108. Bracket 258 includes opposing side walls 262 at opposing ends of drum 228, as shown in FIGS. 5-7. As drum 228 rotates to extend or retract lifting strap 108, side walls 262 help maintain lifting strap 108 properly positioned on drum 228.

Referring further to FIGS. 5-7, brake system 232 includes a control hub 270, a wrap spring 272 positioned about at least a portion of control hub 270 and at least a portion of brake hub 246, and an actuation mechanism 274. Control hub 270 is positioned about shaft 230 and aligned with respect to shaft 230 by projection 256 to rotate with shaft 230 and drum 228. A suitable retainer, such as a washer 275, retains control hub 270 positioned about shaft 230 and against brake hub 246. As shown in FIG. 6, control hub 270 is generally cylindrical and has a diameter substantially equal to the diameter of brake hub 246.

Wrap spring 272 is configured to frictionally engage control hub 270 and brake hub 246 to stop and/or prevent drum 228 from rotating with gear wheel 226 and to allow a user to manually lower lifting strap 108. Wrap spring 272 includes an end tang 276 and a control tang 278. End tang 276 is retained in a slot 280 defined on an outer surface of control hub 270 and control tang 278 is engaged by actuation mechanism 274, as described below. End tang 276 is configured to provide a predetermined stop action for when control tang 278 is released. Because a load on lifting strap 108 is always in the same direction due to gravity, wrap spring 272 is biased toward remaining tight around brake hub 246 and control hub 270 regardless of whether lifting strap 108 is being extended or retracted.

Actuation mechanism 274 is actuatable to engage control tang 278 and move control tang 278 to expand wrap spring 272 in the radial direction. With wrap spring 272 expanded in the radial direction, shaft 230 and drum 228 are rotatable with respect to gear wheel 226. In the embodiment shown in FIGS. 5-7, actuation mechanism 274 includes a ratchet 282, a spring 284, a ratchet wheel 286, and a manual release 288 coupled to ratchet 282. In some contemplated embodiments, actuation mechanism 274 includes solenoids and/or other suitable electronic components to move control tang 278 and allow shaft 230 and drum 228 to rotate with respect to gear wheel 226.

As shown in FIGS. 5 and 6, ratchet wheel 286 is positioned about brake hub 246 and is coupled to control tang 278. Ratchet wheel 286 includes ramped gear teeth 290 that engage ratchet 282 in one direction to rotate ratchet wheel 286 and move control tang 278 to open wrap spring 272 and expand a diameter of wrap spring 272 in a radial direction with respect to the longitudinal axis of shaft 230. With wrap spring 272 expanded in the radial direction, shaft 230 and drum 228 are rotatable with respect to gear wheel 226 to extend lifting strap 108. In one embodiment, ratchet 282 is positioned about ratchet wheel 286 and includes one or more ramped gear teeth (not shown) that are configured to engage gear teeth 290 of ratchet wheel 286 when manual release 288 is actuated. In some contemplated embodiments, manual release 288 includes a cable, a rope, or another suitable component that is coupled to ratchet 282 and configured to rotate ratchet 282 with respect to ratchet wheel 286 from a first or initial position to a second position in which ratchet 282 engages ratchet wheel 286 as manual release 288 is pulled or moved by a user. Spring 284 is used to return ratchet 282 to the first position once the user releases manual release 288.

Referring again to FIGS. 5 and 7, spring 284 is coupled between a tab 294 formed on an outer circumferential surface of ratchet 282 and a tab 296 formed on a support member 298, which is fixedly coupled to gear housing 234. A hook 300 or other suitable projection formed on or within ratchet 282 contacts a chamfer 302 formed on support member 298 with ratchet 282 in the first position, as shown in FIG. 5, to disengage hook 300 from a cooperating gear tooth on ratchet wheel 286. As ratchet 282 engages ratchet wheel 286 upon actuation of manual release 288, ratchet 282 moves from the first position, with hook 300 contacting chamfer 302, to the second position with hook 300 engaged with a cooperating gear tooth 290 on ratchet wheel 286 so that as ratchet 282 rotates, ratchet wheel 286 is urged to rotate with ratchet 282. With ratchet 282 in the second position, spring 284 is stretched to bias ratchet 282 towards the first position to facilitate returning ratchet 282 to the first position to disengage ratchet 282 from ratchet wheel 286.

In operation, the user actuates manual release 288 to allow lifting strap 108 to be manually extended. As manual release 288 is actuated, ratchet 282 engages ratchet wheel 286 and rotates ratchet wheel 286 about shaft 230. The rotation of ratchet wheel 286 moves control tang 278 from a first location on a circumferential surface of brake hub 246 to a second location on the circumferential surface of brake hub 246 different than the first location, causing wrap spring 272 to unwind and expand in the radial direction to allow control hub 270 and drum 228 to rotate with respect to gear wheel 226. As control hub 270 and drum 228 rotate, slack in wrap spring 272 is taken up and control tang 278 is released, which causes wrap spring 272 to tighten again and stop drum 228 and control hub 270 from rotating with respect to gear wheel 226. In contemplated embodiments, lifting strap 108 is manually extendible by 1-8 centimeters (cm) or, more specifically, 2-6 cm, or, even more specifically 3-4 cm, and all subranges therebetween. In a particular embodiment, when manual release 288 is actuated lifting strap 108 is manually extended at least 3 cm. When manual release 288 is released, ratchet 282 disengages ratchet wheel 286 and spring 284 urges ratchet 282 back to the first position.

Figure 8:
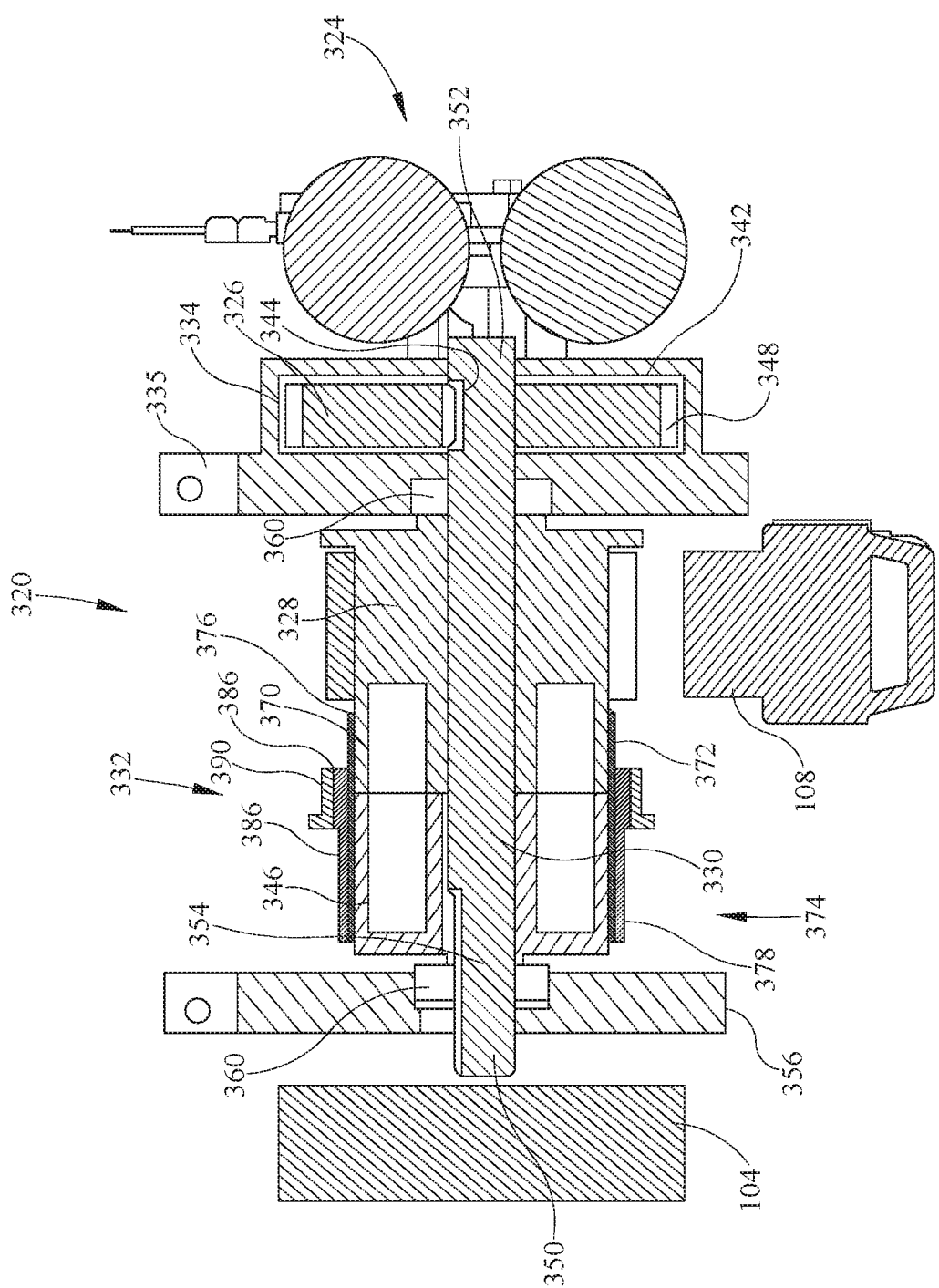
FIG. 8 is a sectional side view of an alternative embodiment of a movement system suitable for use with the rail-mounted overhead patient lift system shown in FIG. 1 according to one embodiment described herein.

In an exemplary alternative embodiment as shown in FIG. 8, a movement system 320 suitable for use with overhead patient lift system 100 is contained at least partially within and supported by lift unit 104 and operatively coupled to lifting strap 108. Movement system 320 includes a dual-motor system 324, a gear wheel 326 operatively coupled to dual-motor system 324, a drum 328, a shaft 330, and a brake system 332. In one embodiment, gear wheel 326 and drum 328 are coupled to shaft 330 to rotate with shaft 330 as shaft 330 is driven by dual-motor system 324. Dual-motor system 324 includes a motor shaft and a motor gear coupled to the motor shaft (not shown in FIG. 8) configured to engage gear wheel 326. In a contemplated embodiment, the motor gear meshes with or is otherwise operatively coupled to gear wheel 326 such that as the motor gear rotates with the motor shaft, the rotation of the motor gear causes gear wheel 326 to rotate. As gear wheel 326 rotates, shaft 330 and drum 328 rotate and lifting strap 108 is paid-out or taken-up (i.e., extended or retracted, respectively) in order to lower or raise the patient supported by a lifting device, such as a sling, attached to lifting strap 108.

In the embodiment shown in FIG. 8, gear wheel 326 is positioned within a gear housing 334 including a mounting plate 335. In an alternative embodiment, mounting plate 335 is coupled to gear housing 334. Gear wheel 326 includes a motor engaging portion 342 and defines a shaft opening 344. A brake hub 346 is operatively coupled to gear wheel 326. Motor engaging portion 342 includes gear teeth 348 that engage gear teeth on the motor gear. Brake hub 346 is generally cylindrical in shape and is configured to engage or operatively couple to brake system 332.

As shown in FIG. 8, shaft 330 extends through shaft opening 344 in gear wheel 326 and openings in gear housing 334. Shaft 330 has a first end 350, an opposing second end 352, and a slot 354 defined in shaft 330 at or near first end 350. Brake system 332 is operatively coupled at or near first end 350. In this embodiment, brake system 332 is actuatable to stop and/or prevent the rotation of shaft 330. In some contemplated embodiments, first end 350 of shaft 330 is positioned within an opening defined by a mounting plate 356, which is coupled to lift unit 104. Bearings 360 are positioned at or near opposing first end 350 and second end 352 of shaft 330 to facilitate rotation of shaft 330 and drum 328 in a clockwise or counter-clockwise rotational direction to extend or retract lifting strap 108.

Referring further to FIG. 8, brake system 332 includes a control hub 370, a wrap spring 372 positioned about at least a portion of control hub 370 and at least a portion of brake hub 346, and an actuation mechanism 374 operatively coupled to control hub 370 and wrap spring 372. Control hub 370 is positioned about shaft 330 and aligned with respect to shaft 330 to rotate with drum 328. Control hub 370 is generally cylindrical and has an outer diameter substantially equal to the outer diameter of brake hub 346 and an outer diameter of drum 328. Wrap spring 372 is configured to frictionally engage control hub 370 and brake hub 346 to stop and/or prevent rotation of shaft 330 and gear wheel 326 to allow a user to manually lower lifting strap 108. Wrap spring 372 is configured to expand in a radial direction with respect to a longitudinal axis of shaft 330 to allow control hub 370 and drum 328 to rotate with respect to gear wheel 326. Because a load on lifting strap 108 is always in the same direction due to gravity, wrap spring 372 is biased toward remaining tight around brake hub 346 and control hub 370 regardless of whether lifting strap 108 is being extended or retracted. Wrap spring 372 includes an end tang 376 and a control tang 378. End tang 376 is retained in a slot 380 defined on an outer surface of control hub 370 and control tang 378 is engaged by actuation mechanism 374, as described below. End tang 376 is configured to provide a predetermined stop action for when control tang 378 is released.

Actuation mechanism 374 is actuatable to engage control tang 378 and move control tang 378 to expand wrap spring 372 in the radial direction. With wrap spring 372 expanded in the radial direction, drum 328 is rotatable with respect to shaft 330 and gear wheel 326. In the embodiment shown in FIG. 8, actuation mechanism 374 includes a ratchet 382, a spring the same or similar to spring 284 (not shown in FIG. 8), a ratchet wheel 386, and a manual release the same or similar to manual release 288 (not shown in FIG. 8) coupled to ratchet 382. In some contemplated embodiments, actuation mechanism 374 includes solenoids and/or other suitable electronic components to move control tang 378 and allow drum 328, control hub 370, and wrap spring 372 to rotate with respect to shaft 330 and gear wheel 326.

As shown in FIG. 8, ratchet wheel 386 is positioned about at least a portion of brake hub 346 and/or at least a portion of control hub 370 and coupled to control tang 378. Ratchet wheel 386 includes ramped gear teeth 390 that engage ratchet 382 in one direction to rotate ratchet wheel 386 and move control tang 378 to open wrap spring 372 and expand a diameter of wrap spring 372 in a radial direction with respect to the longitudinal axis of shaft 330. With wrap spring 372 expanded in the radial direction, drum 328, along with control hub 370 and wrap spring 372, are rotatable with respect to shaft 330 and gear wheel 326 to manually extend lifting strap 108. In one embodiment, ratchet 382 is positioned about ratchet wheel 386 and includes one or more ramped gear teeth (not shown) that are configured to engage gear teeth 390 of ratchet wheel 386 when the manual release is actuated. In some contemplated embodiments, the manual release includes a cable, a rope, or another suitable component that is coupled to ratchet 382 and configured to rotate ratchet 382 with respect to ratchet wheel 386 from a first or initial position to a second position in which ratchet 382 engages ratchet wheel 386 as the manual release is pulled or moved by a user.

The spring coupled between ratchet 382 and ratchet wheel 386 is used to return ratchet 382 to the first position once the manual release is released. In certain embodiments, the spring is coupled between a tab formed on an outer circumferential surface of ratchet 382 and a tab formed on a support member 398. A hook or other suitable projection formed on or within ratchet 382 contacts a chamfer formed on support member 398 with ratchet 382 in the first position to disengage the hook from a cooperating gear tooth on ratchet wheel 386. As ratchet 382 engages ratchet wheel 386 upon actuation of the manual release, ratchet 382 moves from the first position, with the hook contacting the chamfer, to the second position with the hook engaged with a cooperating gear tooth 390 on ratchet wheel 386 so that as ratchet 382 rotates, ratchet wheel 386 is urged to rotate with ratchet 382. With ratchet 382 in the second position, the spring is stretched to bias ratchet 382 towards the first position to facilitate returning ratchet 382 to the first position to disengage ratchet 382 from ratchet wheel 386.

In operation, the user actuates the manual release to allow lifting strap 108 to be manually extended. As the manual release is actuated, ratchet 382 engages ratchet wheel 386 and rotates ratchet wheel 386 about shaft 330. The rotation of ratchet wheel 386 moves control tang 378 from a first location on a circumferential surface of brake hub 346 or control hub 370 to a second location on the circumferential surface of brake hub 346 or control hub 370 different than the first location, causing wrap spring 372 to unwind and expand in the radial direction to allow drum 328, control hub 370, and wrap spring 372 to rotate with respect to shaft 330 and gear wheel 326. As drum 328, control hub 370, and wrap spring 372 rotate, slack in wrap spring 372 is taken up and control tang 378 is released, which causes wrap spring 372 to tighten again and stop drum 328, control hub 370, and wrap spring 372 from rotating with respect to shaft 330 and gear wheel 226. In contemplated embodiments, lifting strap 108 is manually extendible by 1-8 centimeters (cm) or, more specifically, 2-6 cm, or, even more specifically 3-4 cm, and all subranges therebetween. In a particular embodiment, when the manual release is actuated lifting strap 108 is manually extended at least 3 cm. When the manual release is released, ratchet 382 disengages ratchet wheel 386 and the spring urges ratchet 382 back to the first position.

Figure 9:
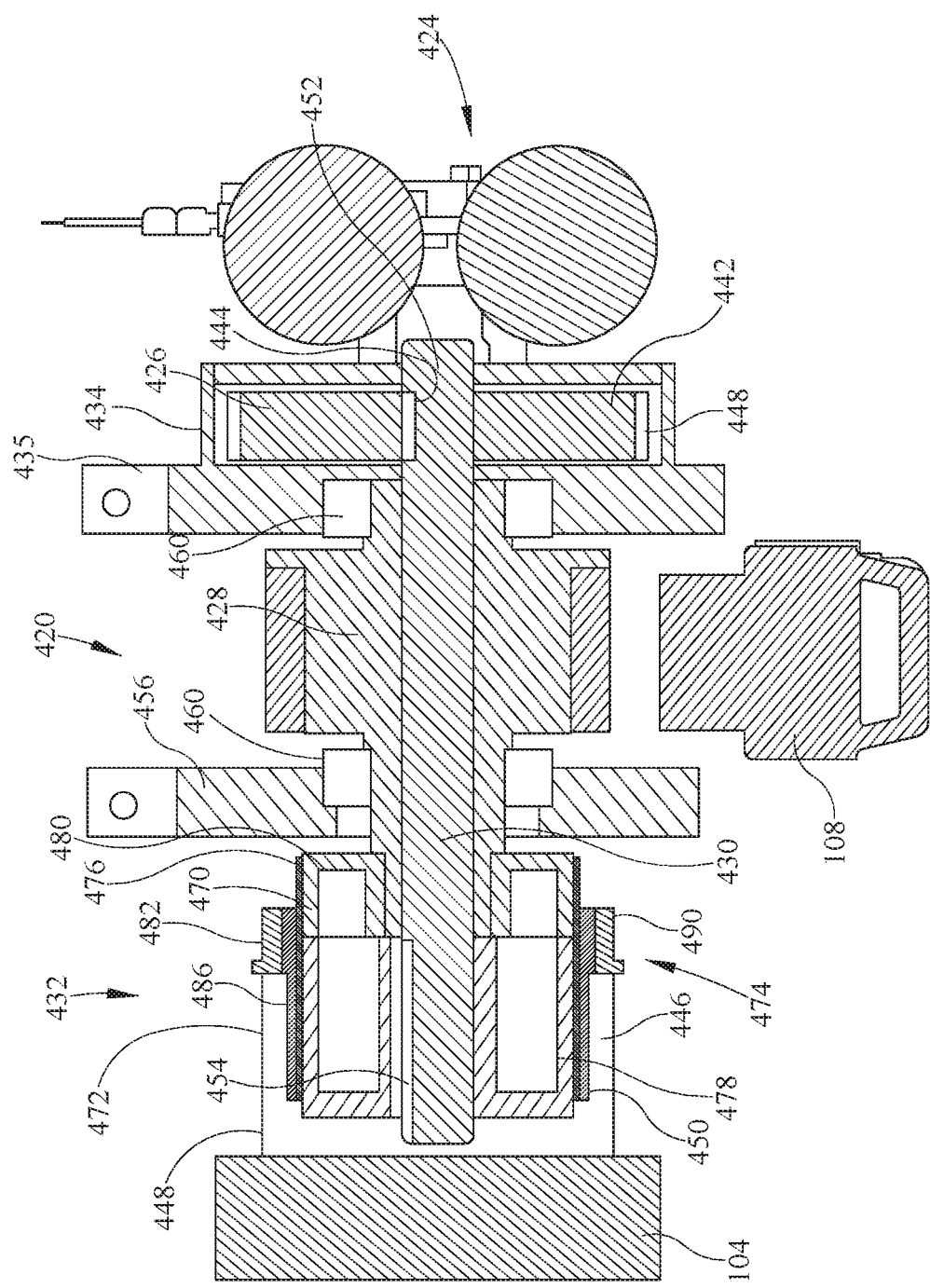
FIG. 9 is a sectional side view of an alternative embodiment of a movement system suitable for use with the rail-mounted overhead patient lift system shown in FIG. 1 according to one embodiment described herein.

In an exemplary alternative embodiment as shown in FIG. 9, a movement system 420 suitable for use with overhead patient lift system 100 is contained at least partially within and supported by lift unit 104 and operatively coupled to lifting strap 108. Movement system 420 includes a dual-motor system 424, a gear wheel 426 operatively coupled to dual-motor system 424, a drum 428, a shaft 430, and a brake system 432. In one embodiment, gear wheel 426 and drum 428 are coupled to shaft 430 to rotate with shaft 430 as shaft 430 is driven by dual-motor system 424. Dual-motor system 424 includes a motor shaft and a motor gear coupled to the motor shaft (not shown in FIG. 9) configured to engage gear wheel 426. In contemplated embodiment, the motor gear meshes with or is otherwise operatively coupled to gear wheel 426 such that as the motor gear rotates with the motor shaft, the rotation of the motor gear causes gear wheel 426 to rotate. As gear wheel 426 rotates, shaft 430 and drum 428 rotate and lifting strap 108 is paid-out or taken-up (i.e., extended or retracted, respectively) in order to lower or raise the patient supported by a lifting device, such as a sling, attached to lifting strap 108.

In the embodiment shown in FIG. 9, gear wheel 426 is positioned within a gear housing 434 including a mounting plate 435. In an alternative embodiment, mounting plate 435 is coupled to gear housing 434. Gear wheel 426 includes a motor engaging portion 442 and defines a shaft opening 444. A brake hub 446 is operatively coupled to gear wheel 426. Motor engaging portion 442 includes gear teeth 448 that engage gear teeth on the motor gear. Brake hub 446 is generally cylindrical in shape and is configured to engage or operatively couple to brake system 432.

Shaft 430 extends through shaft opening 444 in gear wheel 426 and openings in gear housing 434. Shaft 430 has a first end 450, an opposing second end 452, and a slot 454 defined in shaft 430 at or near first end 450. As shown in FIG. 9, brake system 432 is operatively coupled at or near first end 450. In this embodiment, brake system 432 is actuatable to stop and/or prevent the rotation of shaft 430. In some contemplated embodiments, a mounting plate 456 is positioned on an opposite side of drum 428 from mounting plate 435. Mounting plates 456 and 435 couple movement system 420 to lift unit 104. Bearings 460 are positioned within or at respective mounting plates 435 and 456 to facilitate rotation of shaft 430 and drum 428 in a clockwise or counter-clockwise rotational direction to extend or retract lifting strap 108.

Referring further to FIG. 9, brake system 432 includes a control hub 470, a wrap spring 472 positioned about at least a portion of control hub 470 and/or at least a portion of brake hub 446, and an actuation mechanism 474 operatively coupled to control hub 470 and wrap spring 472. Control hub 470 is positioned about shaft 430 and aligned with respect to shaft 430 to rotate with shaft 430 and drum 428. Control hub 470 is generally cylindrical and has an outer diameter substantially equal to the outer diameter of brake hub 446.

Wrap spring 472 is configured to frictionally engage control hub 470 and brake hub 446 to stop and/or prevent rotation of shaft 430 and gear wheel 426 and allow a user to manually lower lifting strap 108. Wrap spring 472 is configured to expand in a radial direction with respect to a longitudinal axis of shaft 430 to allow drum 428, control hub 470, and wrap spring 472 to rotate with respect to shaft 430 and gear wheel 426. Because a load on lifting strap 108 is always in the same direction due to gravity, wrap spring 472 is biased toward remaining tight around brake hub 446 and control hub 470 regardless of whether lifting strap 108 is being extended or retracted. Wrap spring 472 includes an end tang 476 and a control tang 478. End tang 476 is retained in a slot 480 defined on an outer surface of control hub 470 and control tang 478 is engaged by actuation mechanism 474, as described below. End tang 476 is configured to provide a predetermined stop action for when control tang 478 is released.

Actuation mechanism 474 is actuatable to engage control tang 478 and move control tang 478 to expand wrap spring 472 in the radial direction. With wrap spring 472 expanded in the radial direction, drum 428, control hub 470, and wrap spring 472 are rotatable with respect to shaft 430 and gear wheel 426. In the embodiment shown in FIG. 9, actuation mechanism 474 includes a ratchet 482, a spring the same or similar to spring 284 (not shown in FIG. 9), a ratchet wheel 486, and a manual release the same or similar to manual release 288 (not shown in FIG. 9) coupled to ratchet 482. In some contemplated embodiments, actuation mechanism 474 includes solenoids and/or other suitable electronic components to move control tang 478 and allow drum 428, control hub 470, and wrap spring 472 to rotate with respect to shaft 430 and gear wheel 426.

As shown in FIG. 9, ratchet wheel 486 is positioned about at least a portion of brake hub 446 and/or at least a portion of control hub 470 and coupled to control tang 478. Ratchet wheel 486 includes ramped gear teeth 490 that engage ratchet 482 in one direction to rotate ratchet wheel 486 and move control tang 478 to open wrap spring 472 and expand a diameter of wrap spring 472 in a radial direction with respect to the longitudinal axis of shaft 430. With wrap spring 472 expanded in the radial direction, drum 428, along with control hub 470 and wrap spring 472, are rotatable with respect to shaft 430 and gear wheel 426 to manually extend lifting strap 108. In one embodiment, ratchet 482 is positioned about ratchet wheel 486 and includes one or more ramped gear teeth (not shown) that are configured to engage gear teeth 490 of ratchet wheel 486 when the manual release is actuated. In some contemplated embodiments, the manual release includes a cable, a rope, or another suitable component that is coupled to ratchet 482 and configured to rotate ratchet 482 with respect to ratchet wheel 486 from a first or initial position to a second position in which ratchet 482 engages ratchet wheel 486 as the manual release is pulled or moved by a user.

The spring coupled between ratchet 482 and ratchet wheel 486 is used to return ratchet 482 to the first position once the manual release is released. In certain embodiments, the spring is coupled between a tab formed on an outer circumferential surface of ratchet 482 and a tab formed on a support member 498. A hook or other suitable projection formed on or within ratchet 482 contacts a chamfer formed on support member 498 with ratchet 482 in the first position to disengage the hook from a cooperating gear tooth on ratchet wheel 486. As ratchet 482 engages ratchet wheel 486 upon actuation of the manual release, ratchet 482 moves from the first position, with the hook contacting the chamfer, to the second position with the hook engaged with a cooperating gear tooth 490 on ratchet wheel 486 so that as ratchet 482 rotates about shaft 470, ratchet wheel 486 is urged to rotate with ratchet 482. With ratchet 482 in the second position, the spring is stretched to bias ratchet 482 towards the first position to facilitate returning ratchet 482 to the first position to disengage ratchet 482 from ratchet wheel 486.

In operation, the user actuates the manual release to allow lifting strap 108 to be manually extended. As the manual release is actuated, ratchet 482 engages ratchet wheel 486 and rotates ratchet wheel 486 about shaft 430. The rotation of ratchet wheel 486 moves control tang 478 from a first location on a circumferential surface of brake hub 446 or control hub 470 to a second location on the circumferential surface of brake hub 446 or control hub 470 different than the first location, causing wrap spring 472 to unwind and expand in the radial direction to allow drum 428, control hub 470, and wrap spring 472 to rotate with respect to shaft 430 and gear wheel 426. As drum 428, control hub 470, and wrap spring 472 rotate, slack in wrap spring 472 is taken up and control tang 478 is released, which causes wrap spring 472 to tighten again and stop drum 428, control hub 470, and wrap spring 472 from rotating with respect to shaft 430 and gear wheel 426. In contemplated embodiments, lifting strap 108 is manually extendible by 1-8 centimeters (cm) or, more specifically, 2-6 cm, or, even more specifically 3-4 cm, and all subranges therebetween. In a particular embodiment, when the manual release is actuated lifting strap 108 is manually extended at least 3 cm. When the manual release is released, ratchet 482 disengages ratchet wheel 486 and the spring urges ratchet 482 back to the first position.

Figure 10:
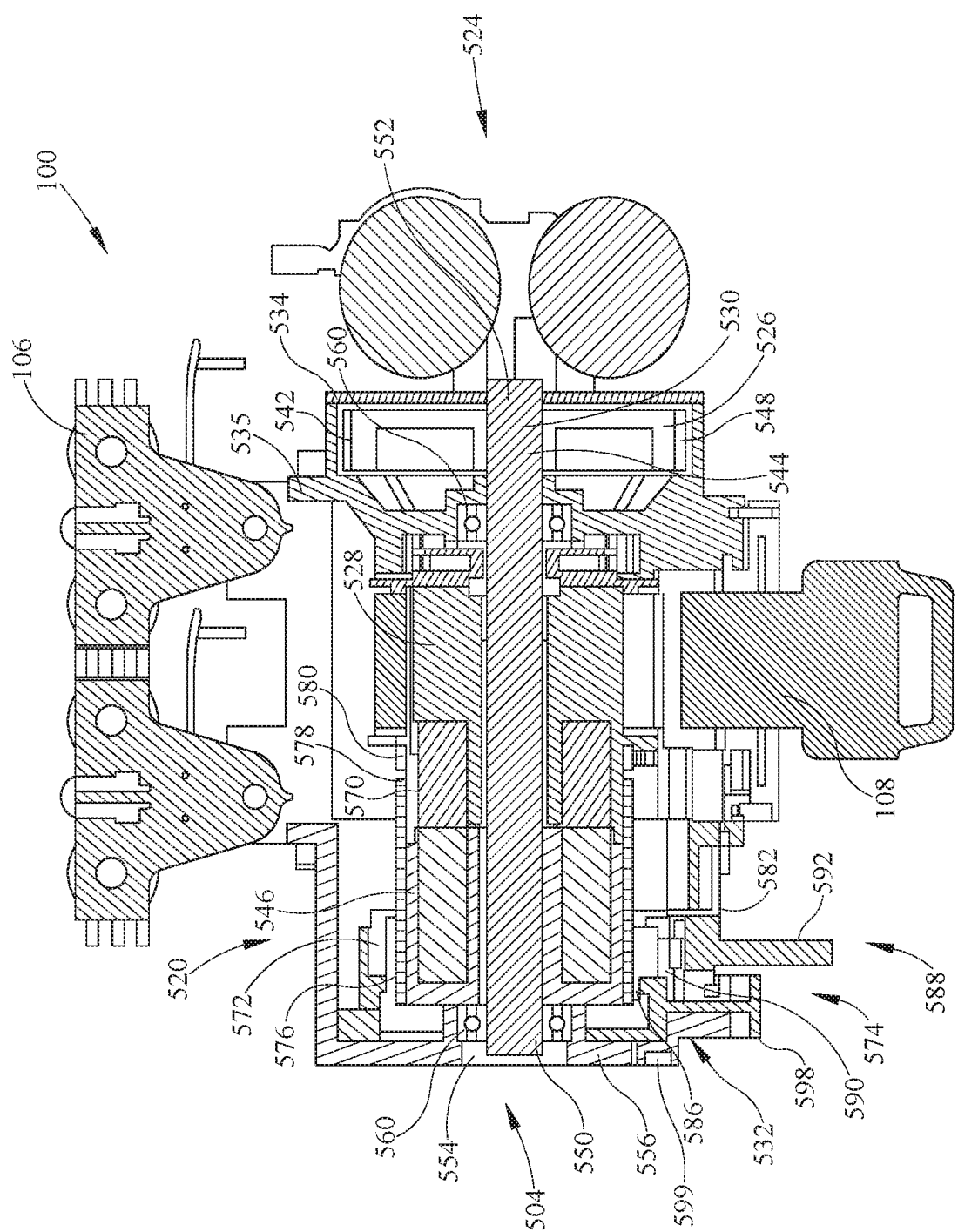
FIG. 10 is a partial sectional side view of an alternative embodiment of a lift unit suitable for use with the rail-mounted overhead patient lift system shown in FIG. 1 according to one embodiment described herein.

Referring to FIG. 10, an exemplary alternative embodiment of a lift unit 504 suitable for use with overhead patient lift system 100 for lifting and/or moving a patient includes a movement system 520 contained at least partially within and supported by lift unit 504 and operatively coupled to lifting strap 108. Movement system 520 includes a dual-motor system 524, a gear wheel 526 operatively coupled to dual-motor system 524, a drum 528, a shaft 530, and a brake system 532. In one embodiment, gear wheel 526 and drum 528 are coupled to shaft 530 to rotate with shaft 530 as shaft 530 is driven by the motor. The motor includes a motor shaft and a motor gear coupled to the motor shaft (not shown in FIG. 10) configured to engage gear wheel 526. In a contemplated embodiment, the motor gear meshes with or is otherwise operatively coupled to gear wheel 526 such that as the motor gear rotates with the motor shaft, the rotation of the motor gear causes gear wheel 526 to rotate. As gear wheel 526 rotates, shaft 530 and drum 528 rotate and lifting strap 108 is paid-out or taken-up (i.e., extended or retracted, respectively) in order to lower or raise the patient supported by a lifting device, such as a sling, attached to lifting strap 108.

In the embodiment shown in FIG. 10, gear wheel 526 is positioned within a gear housing 534 including a mounting plate 535. In an alternative embodiment, mounting plate 535 is coupled to gear housing 534. Gear wheel 526 includes a motor engaging portion 542 and defines a shaft opening 544. A brake hub 546 is operatively coupled to gear wheel 526. Motor engaging portion 542 includes gear teeth 548 that engage gear teeth on the motor gear. Shaft opening 544 is generally concentrically aligned with motor engaging portion 542 and allows shaft 530 to pass therethrough and rotate with gear wheel 526. Brake hub 546 is generally cylindrical in shape and is configured to engage or operatively couple to brake system 532.

Shaft 530 extends through shaft opening 544 in gear wheel 526 and openings in gear housing 534. Shaft 530 has a first end 550, an opposing second end 552, and a slot 554 defined in shaft 530 at or near first end 550. As shown in FIG. 10, brake system 532 is operatively coupled at or near first end 550. In this embodiment, brake system 532 is actuatable to stop and/or prevent the rotation of shaft 530. In some contemplated embodiments, first end 550 of shaft 530 is positioned within an opening defined within a side panel 556 of lift unit 504. Bearings 560 are positioned within the openings defined within gear housing 534 and side panel 556 to facilitate rotation of shaft 530 and drum 528 in a clockwise or counter-clockwise rotational direction to extend or retract lifting strap 108.

Referring further to FIG. 10, brake system 532 includes a control hub 570, a wrap spring 572 positioned about at least a portion of control hub 570 and at least a portion of brake hub 546, and an actuation mechanism 574 operatively coupled to control hub 570 and wrap spring 572. Control hub 570 is positioned about shaft 530 and aligned with respect to shaft 530 to rotate with shaft 530 and drum 528. Wrap spring 572 is configured to frictionally engage control hub 570 and brake hub 546 to stop and/or prevent drum 528 from rotating with shaft 530 and gear wheel 526 to allow a user to manually lower lifting strap 108.

Wrap spring 572 is configured to expand in a radial direction with respect to a longitudinal axis of shaft 530 to allow drum 528, control hub 570 integrated with drum 528, and wrap spring 572 to rotate with respect to shaft 530 and gear wheel 526. Wrap spring 572 includes an end tang 576 and a control tang 578. End tang 576 is retained in a slot 580 defined on an outer surface of control hub 570 and control tang 578 is engaged by actuation mechanism 574, as described below. End tang 576 is configured to provide a predetermined stop action for when control tang 578 is released. Wrap spring 572 is configured to expand in a radial direction with respect to a longitudinal axis of shaft 530 to allow drum 528, control hub 570, and wrap spring 572 to rotate with respect to shaft 530 and gear wheel 526. Because a load on lifting strap 108 is always in the same direction due to gravity, wrap spring 572 is biased toward remaining tight around brake hub 546 and control hub 570 regardless of whether lifting strap 108 is being extended or retracted.

Actuation mechanism 574 is actuatable to engage control tang 578 and move control tang 578 to expand wrap spring 572 in the radial direction. With wrap spring 572 expanded in the radial direction, drum 528, control hub 570, and wrap spring 572 are rotatable with respect to shaft 530 and gear wheel 526. In the embodiment shown in FIG. 10, actuation mechanism 574 includes a ratchet 582, a spring the same or similar to spring 284 (not shown in FIG. 10), a ratchet wheel 586, and a manual release 588 operatively coupled to ratchet 582. In some contemplated embodiments, actuation mechanism 574 includes solenoids and/or other suitable electronic components to move control tang 578 and allow drum 528, control hub 570, and wrap spring 572 to rotate with respect to shaft 530 and gear wheel 526.

As shown in FIG. 10, ratchet wheel 586 is positioned about at least a portion of brake hub 546 and/or at least a portion of control hub 570 and coupled to control tang 578. Ratchet wheel 586 includes ramped gear teeth 590 that engage ratchet 582 in one direction to rotate ratchet wheel 586 and move control tang 578 to open wrap spring 572 and expand a diameter of wrap spring 572 in a radial direction with respect to the longitudinal axis of shaft 530. With wrap spring 572 expanded in the radial direction, drum 528, along with control hub 570 and wrap spring 572, are rotatable with respect to shaft 530 and gear wheel 526 to manually extend lifting strap 108. In one embodiment, ratchet 582 is positioned about ratchet wheel 586 and includes one or more ramped gear teeth (not shown) that are configured to engage gear teeth 590 of ratchet wheel 586 when manual release 588 is actuated. In some contemplated embodiments, manual release 588 includes a cable 592, a rope, or another suitable component that is coupled to ratchet 582 and configured to rotate ratchet 582 with respect to ratchet wheel 586 from a first or initial position to a second position in which ratchet 582 engages ratchet wheel 586 as manual release 588 is pulled or moved by a user.

The spring coupled between ratchet 582 and ratchet wheel 586 is used to return ratchet 582 to the first position once manual release 588 is released. In certain embodiments, the spring is coupled between a tab formed on an outer circumferential surface of ratchet 582 and a tab formed on a support member 598. A hook or other suitable projection formed on or within ratchet 582 contacts a chamfer formed on support member 598 with ratchet 582 in the first position to disengage the hook from a cooperating gear tooth on ratchet wheel 586. As ratchet 582 engages ratchet wheel 586 upon actuation of manual release 588, ratchet 582 moves from the first position, with the hook contacting the chamfer, to the second position with the hook engaged with a cooperating gear tooth 590 on ratchet wheel 586 so that as ratchet 582 rotates about shaft 570, ratchet wheel 586 is urged to rotate with ratchet 582. With ratchet 582 in the second position, the spring is stretched to bias ratchet 582 towards the first position to facilitate returning ratchet 582 to the first position to disengage ratchet 582 from ratchet wheel 586.

In operation, the user actuates manual release 588 to allow lifting strap 108 to be manually extended. In a particular embodiment, manual release 588 is actuated to move to a first or intermediate position to activate an electrical emergency switch that cuts off power supply to dual-motor system 524. As the manual release is actuated to move to a second position, ratchet 582 engages ratchet wheel 586 and rotates ratchet wheel 586 about shaft 530. The rotation of ratchet wheel 586 moves control tang 578 from a first location on a circumferential surface of brake hub 546 or control hub 570 to a second location on the circumferential surface of brake hub 546 or control hub 570 different than the first location, causing wrap spring 572 to unwind and expand in the radial direction to allow drum 528, control hub 570, and wrap spring 572 to rotate with respect to shaft 530 and gear wheel 526. As drum 528, control hub 570, and wrap spring 572 rotate, slack in wrap spring 572 is taken up and control tang 578 is released, which causes wrap spring 572 to tighten again and stop drum 528, control hub 570, and wrap spring 572 from rotating with respect to shaft 530 and gear wheel 526. In contemplated embodiments, lifting strap 108 is manually extendible by 1-8 centimeters (cm) or, more specifically, 2-6 cm, or, even more specifically 3-4 cm, and all subranges therebetween. In a particular embodiment, when the manual release is actuated lifting strap 108 is manually extended at least 3 cm. When the manual release is released, ratchet 582 disengages ratchet wheel 586 and the spring urges ratchet 582 back to the first position. In a particular embodiment, a roller switch 599 or another suitable switch is moveable to rest the electrical emergency switch activated when manual release 588 is moved to the first or intermediate position.

Figure 11:
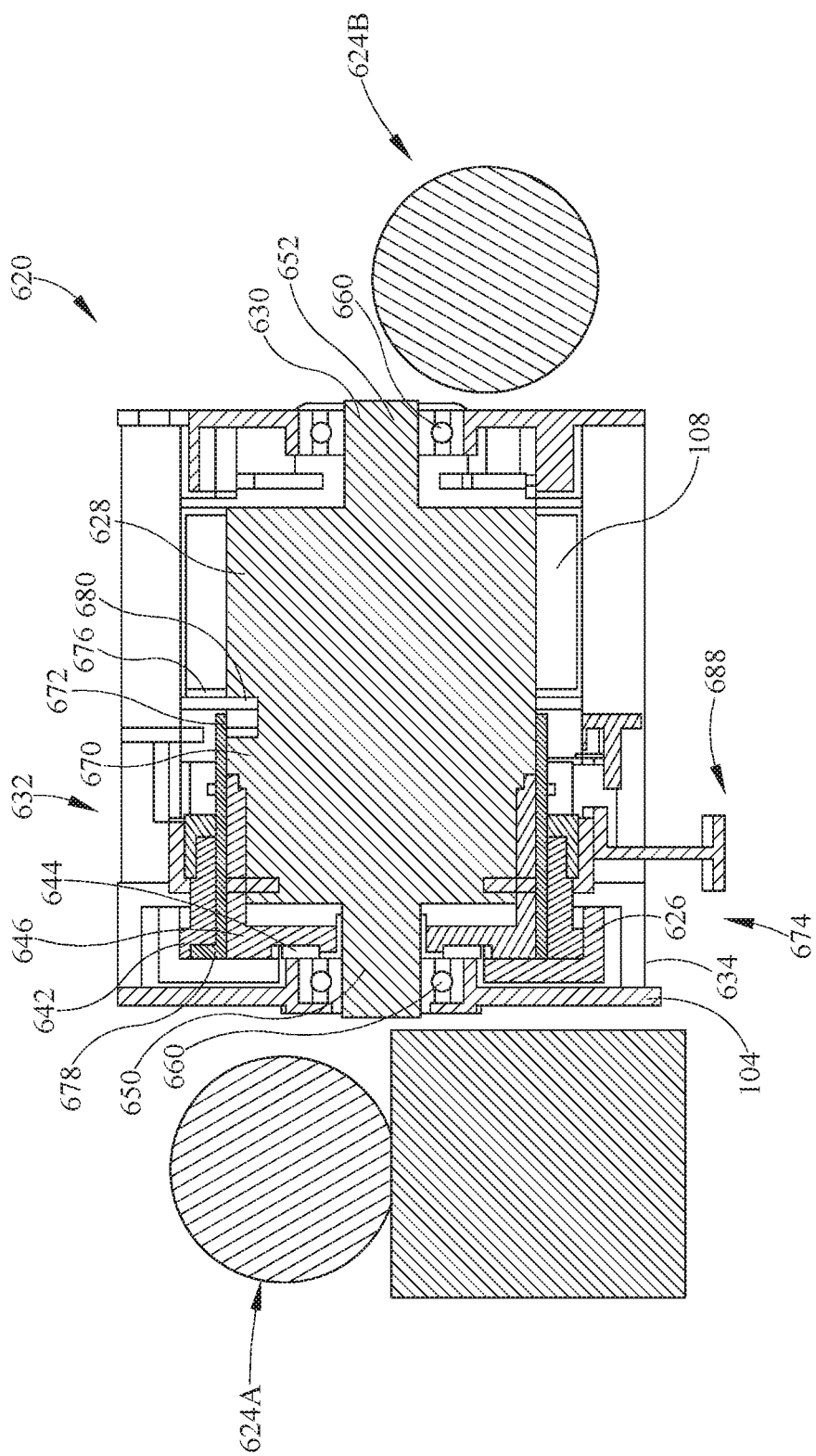
FIG. 11 is a partial sectional side view of an alternative embodiment of a movement system suitable for use with the rail-mounted overhead patient lift system shown in FIG. 1 according to one embodiment described herein.
Figure 12:
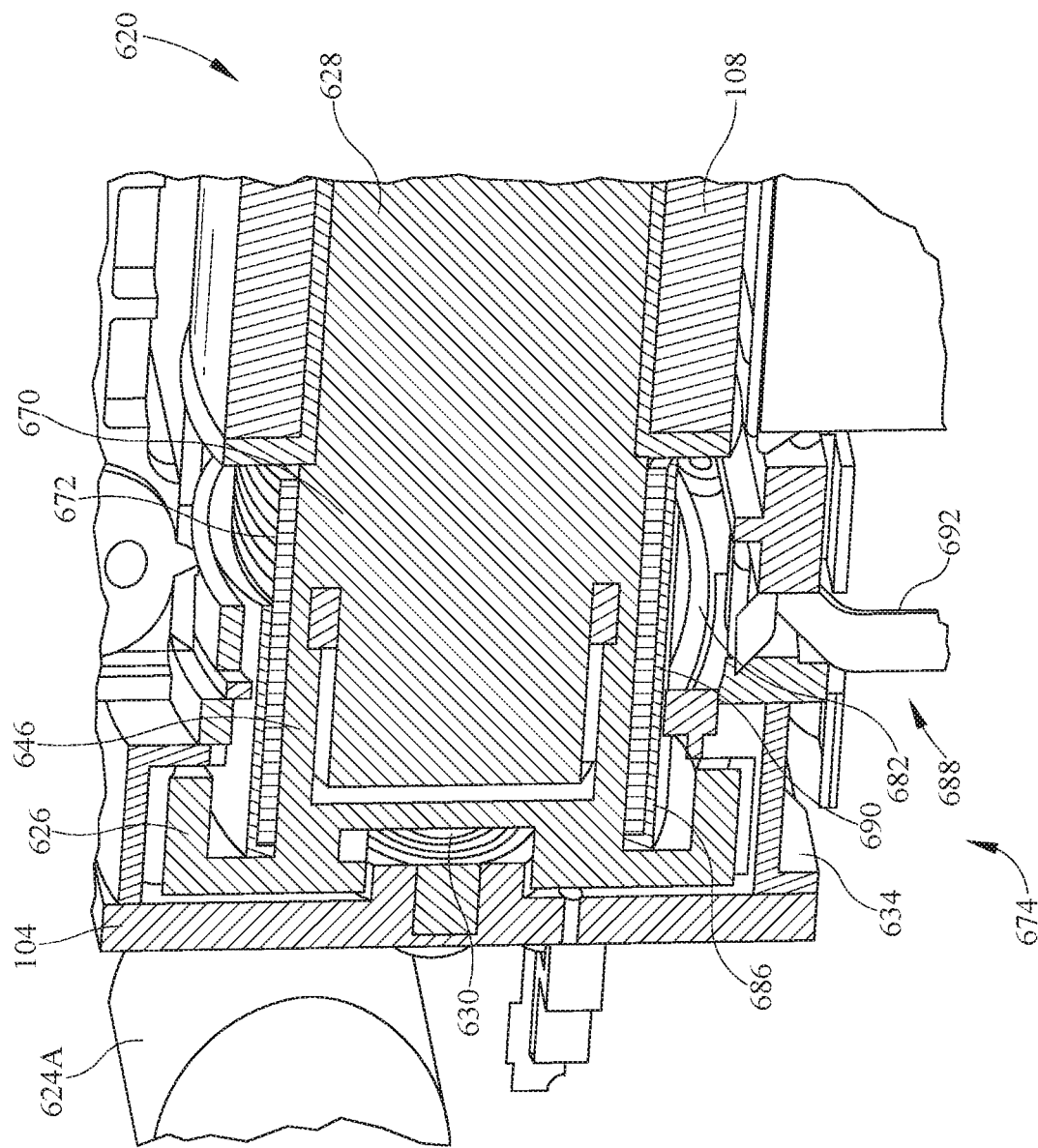
FIG. 12 is a sectional side view of a portion of the movement system shown in FIG. 11.
Figure 13:
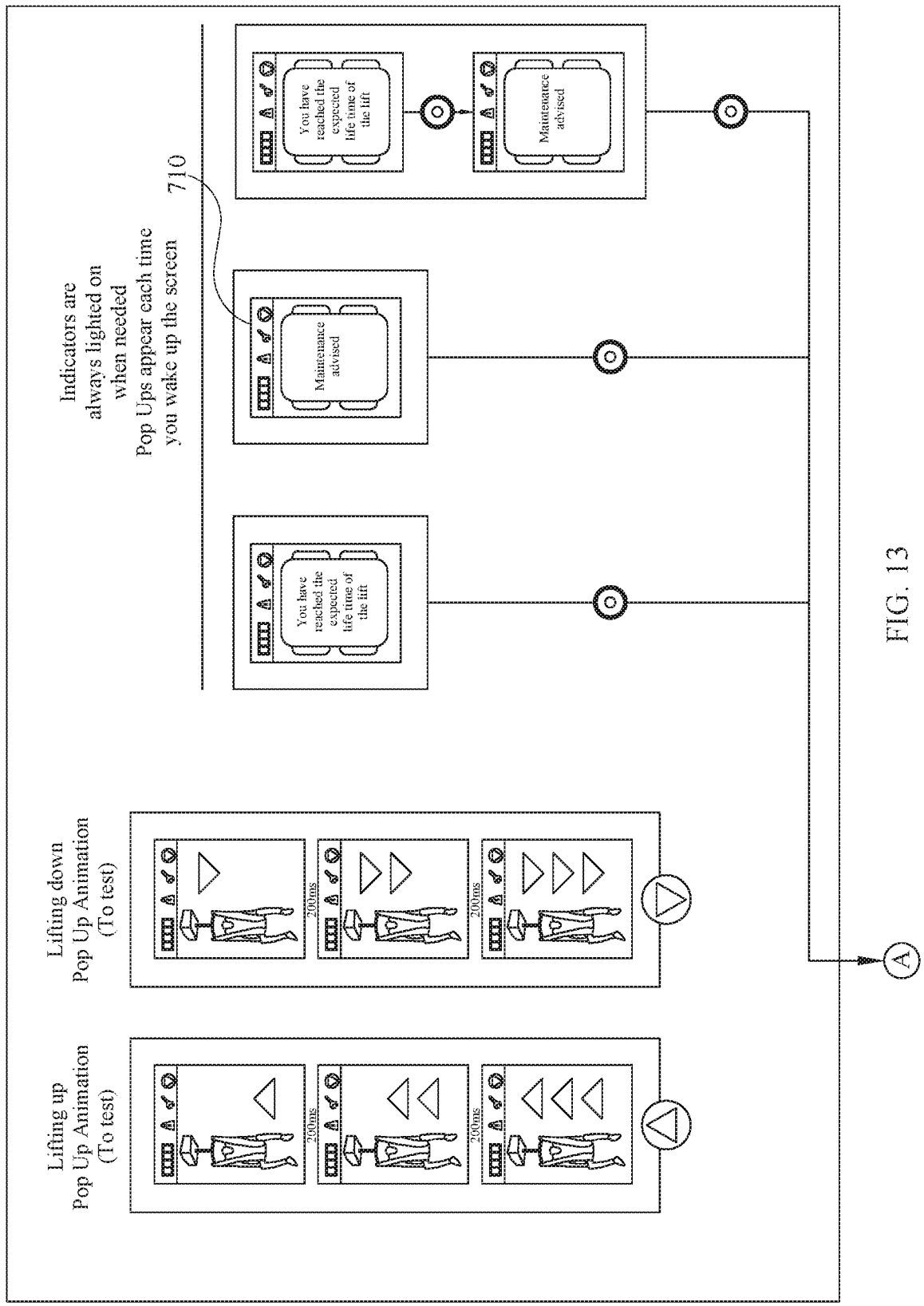
FIGS. 13-20 illustrate various screenshots of a display according to one or more embodiments described herein.
Figure 14:
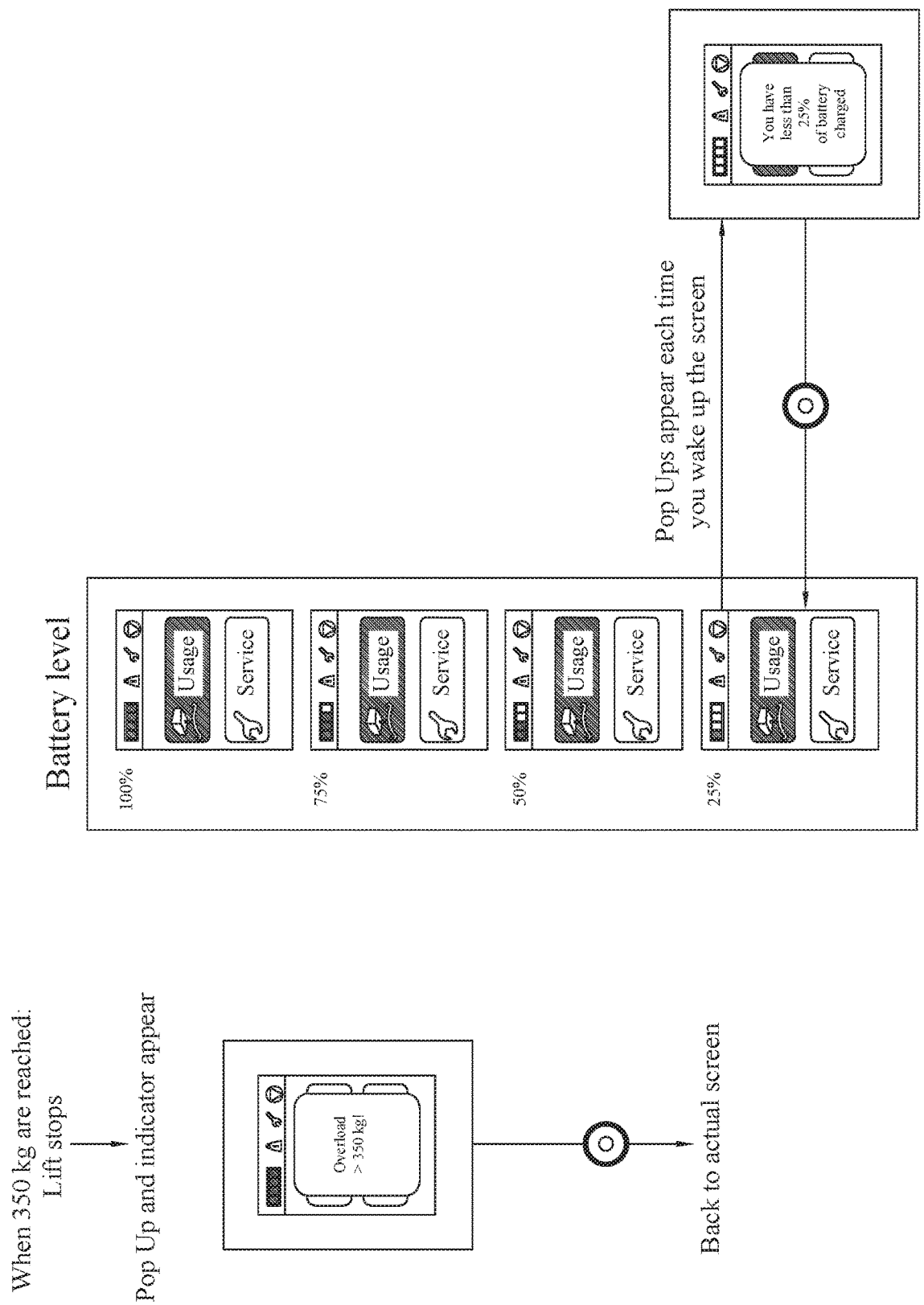
Figure 15:
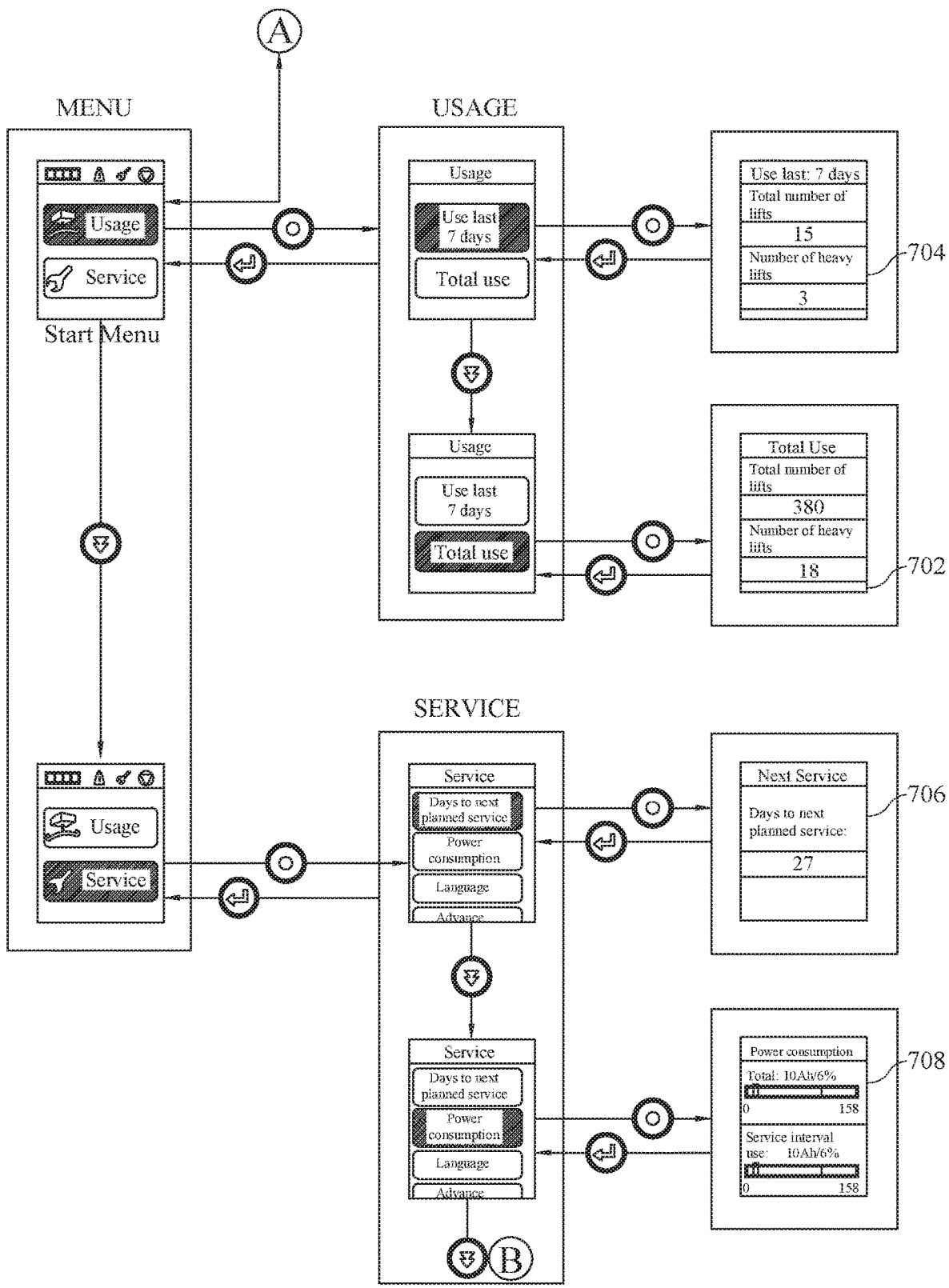
Figure 16:
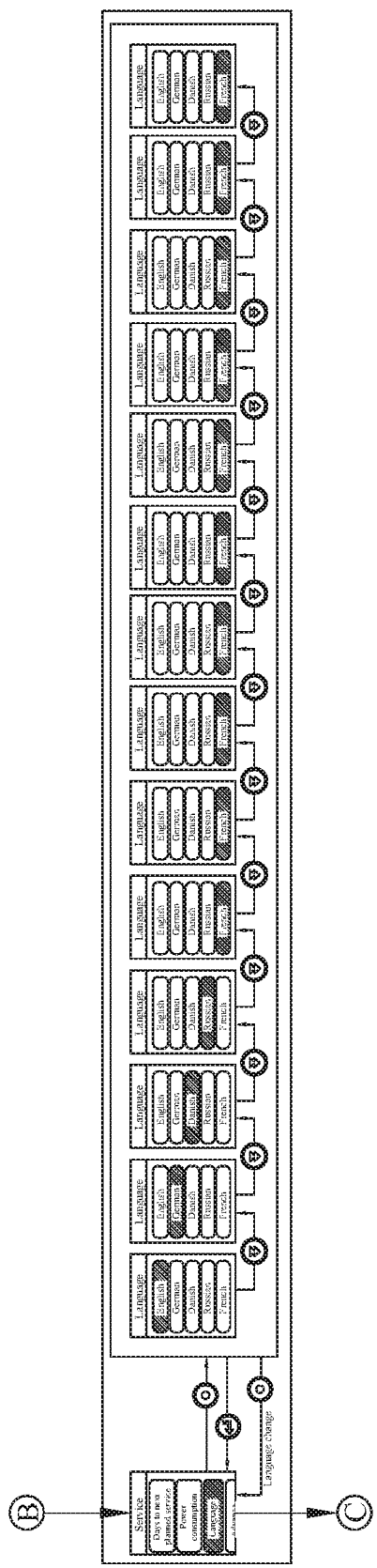
Figure 17:
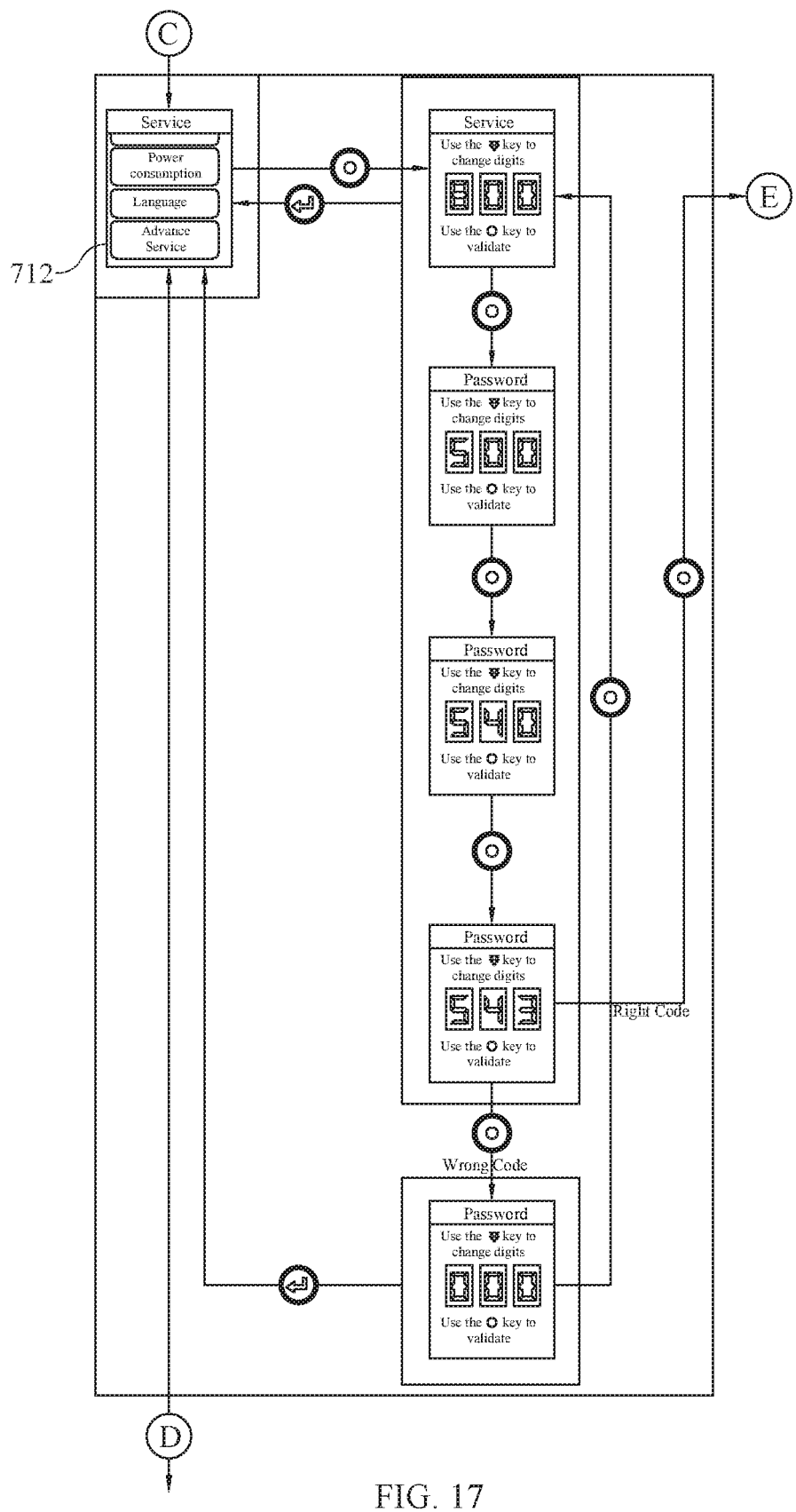
Figure 18:
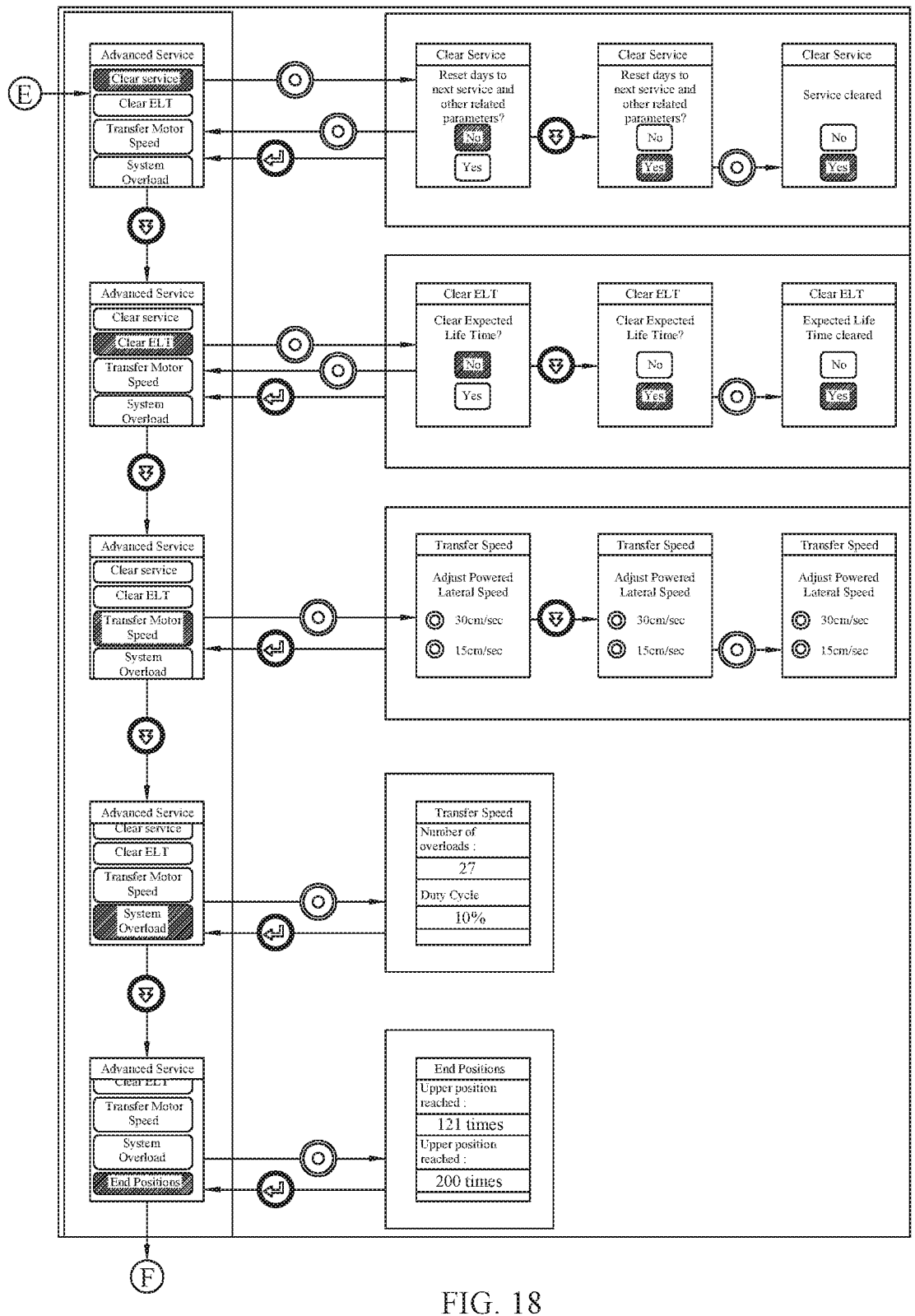
Figure 19:
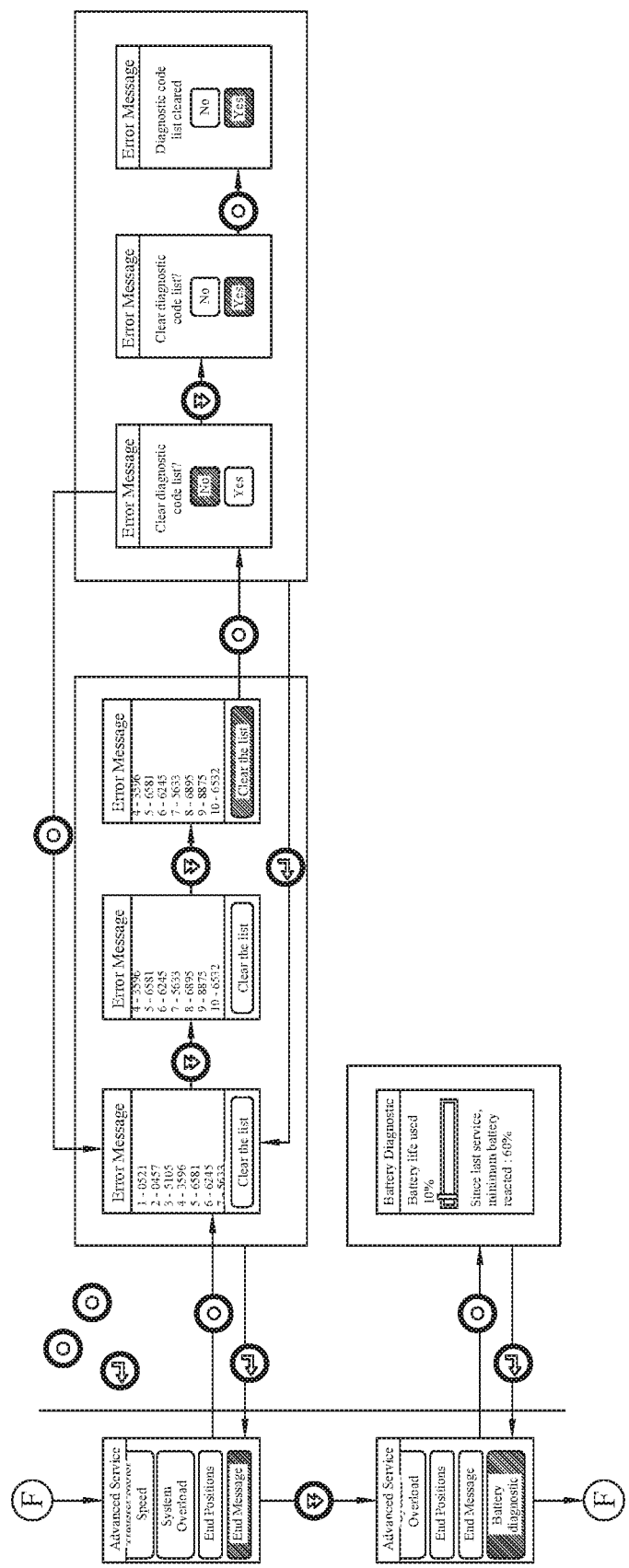
Figure 20:
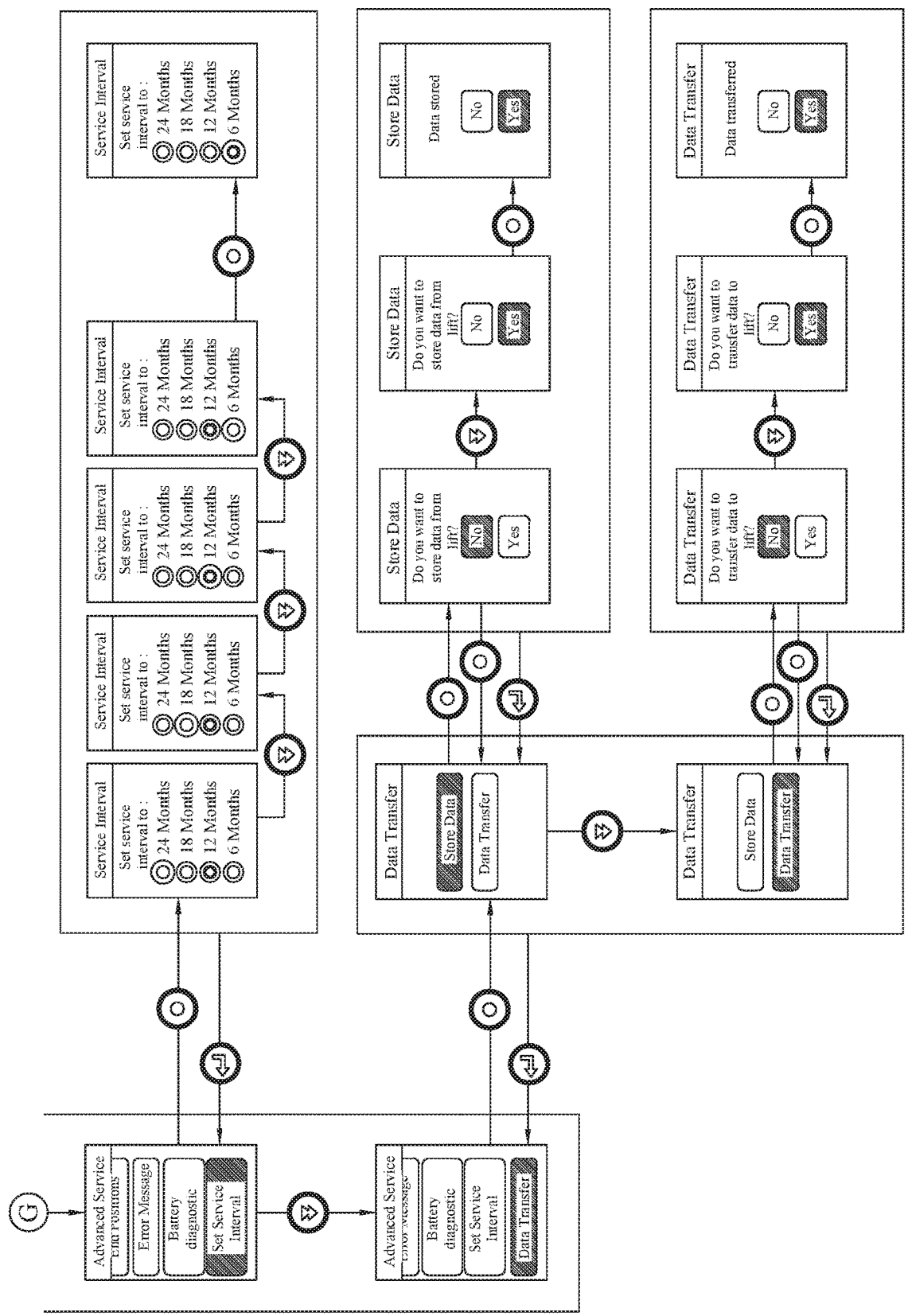

In an exemplary alternative embodiment as shown in FIGS. 11 and 12, a movement system 620 suitable for use with overhead patient lift system 100 is contained at least partially within and supported by lift unit 104 and operatively coupled to lifting strap 108. Movement system 620 includes a dual-motor system including a first motor 624A operatively coupled to a second motor 624B, a gear wheel 626 operatively coupled to the dual-motor system, a drum portion 628 defined by a shaft 630, and a brake system 632. In one embodiment, gear wheel 626 is coupled to shaft 630 to rotate with shaft 630 as shaft 630 is driven by the dual-motor system. The dual-motor system includes a motor shaft and a motor gear coupled to the motor shaft (not shown in FIG. 11) configured to engage gear wheel 626. In a contemplated embodiment, the motor gear meshes with or is otherwise operatively coupled to gear wheel 626 such that as the motor gear rotates with the motor shaft, the rotation of the motor gear causes gear wheel 626 to rotate. As gear wheel 626 rotates, shaft 630 and drum portion 628 rotate and lifting strap 108 is paid-out or taken-up (i.e., extended or retracted, respectively) in order to lower or raise the patient supported by a lifting device, such as a sling, attached to lifting strap 108.

In the embodiment shown in FIGS. 11 and 12, gear wheel 626 is positioned within a gear housing 634. Gear wheel 626 includes a motor engaging portion 642 and defines a shaft opening 644. Shaft opening 644 is generally concentrically aligned with motor engaging portion 642 and allows shaft 630 to pass therethrough and rotate with respect to gear wheel 626. Shaft 630 extends through shaft opening 644 in gear wheel 626 and openings in gear housing 634. Shaft 630 has a first end 650 and an opposing second end 652. As shown in FIGS. 11 and 12, brake system 632 is operatively coupled at or near first end 650. In this embodiment, brake system 632 is actuatable to stop or prevent the rotation of shaft 630. In some contemplated embodiments, first end 650 of shaft 630 is positioned within an opening defined by lift unit 104. Bearings 660 are positioned at or near opposing first end 650 and second end 652 of shaft 630 to facilitate rotation of shaft 630 and drum portion 628 in a clockwise or counter-clockwise rotational direction to extend or retract lifting strap 108.

Referring further to FIGS. 11 and 12, brake system 632 includes a control hub 670, a wrap spring 672 positioned about control hub 670, and an actuation mechanism 674 operatively coupled to control hub 670 and wrap spring 672. Control hub 670 is positioned about shaft 630 and aligned with respect to shaft 630 to rotate with shaft 630. Control hub 670 is generally cylindrical and has an outer diameter substantially equal to an outer diameter of drum portion 628. Wrap spring 672 is configured to frictionally engage control hub 670 and a brake hub portion 646 of shaft 630 to stop and/or prevent rotation of shaft 630 and gear wheel 626 to allow a user to manually lower lifting strap 108. Wrap spring 672 is configured to expand in a radial direction with respect to a longitudinal axis of shaft 630 to allow drum 628, control hub 670, and wrap spring 672 to rotate with respect to shaft 630 and gear wheel 626. Because a load on lifting strap 108 is always in the same direction due to gravity, wrap spring 672 is biased toward remaining tight around brake hub 646 and control hub 670 regardless of whether lifting strap 108 is being extended or retracted. Wrap spring 672 includes an end tang 676 and a control tang 678. End tang 676 is retained in a slot 680 defined on an outer surface of control hub 670 and control tang 678 is engaged by actuation mechanism 674, as described below. End tang 676 is configured to provide a predetermined stop action for when control tang 678 is released.

Actuation mechanism 674 is actuatable to engage control tang 678 and move control tang 678 to expand wrap spring 672 in the radial direction. With wrap spring 672 expanded in the radial direction, drum 628, control hub 670, and wrap spring 672 are rotatable with respect to shaft 630 and gear wheel 626. In the embodiment shown in FIGS. 11 and 12, actuation mechanism 674 includes a ratchet 682, a spring the same or similar to spring 284 (not shown in FIGS. 11 and 12), a ratchet wheel 686, and a manual release 688 operatively coupled to ratchet 682. In some contemplated embodiments, actuation mechanism 674 includes solenoids and/or other suitable electronic components to move control tang 678 and allow drum 628, control hub 670, and wrap spring 672 to rotate with respect to shaft 630 and gear wheel 626.

As shown in FIGS. 11 and 12, ratchet wheel 686 is positioned about at least a portion of brake hub 646 and/or at least a portion of control hub 670 and coupled to control tang 678. Ratchet wheel 686 includes ramped gear teeth 690 that engage ratchet 682 in one direction to rotate ratchet wheel 686 and move control tang 678 to open wrap spring 672 and expand a diameter of wrap spring 672 in a radial direction with respect to the longitudinal axis of shaft 630. With wrap spring 672 expanded in the radial direction, drum 628, along with control hub 670 and wrap spring 672, are rotatable with respect to shaft 630 and gear wheel 626 to manually extend lifting strap 108. In one embodiment, ratchet 682 is positioned about ratchet wheel 686 and includes one or more ramped gear teeth (not shown) that are configured to engage gear teeth 690 of ratchet wheel 686 when manual release 688 is actuated. In some contemplated embodiments, manual release 688 includes a cable 692 as shown in FIG. 12, a rope, or another suitable component that is coupled to ratchet 682 and configured to rotate ratchet 682 with respect to ratchet wheel 686 from a first or initial position to a second position in which ratchet 682 engages ratchet wheel 686 as manual release 688 is pulled or moved by a user.

In one embodiment, the spring coupled between ratchet 682 and ratchet wheel 686 is used to return ratchet 682 to the first position once manual release 688 is released. In certain embodiments, the spring is coupled between a tab formed on an outer circumferential surface of ratchet 682 and a tab formed on a support member. A hook or other suitable projection formed on or within ratchet 682 contacts a chamfer formed on the support member with ratchet 682 in the first position to disengage the hook from a cooperating gear tooth on ratchet wheel 686. As ratchet 682 engages ratchet wheel 686 upon actuation of manual release 688, ratchet 682 moves from the first position, with the hook contacting the chamfer, to the second position with the hook engaged with a cooperating gear tooth 690 on ratchet wheel 686 so that as ratchet 682 rotates about shaft 670, ratchet wheel 686 is urged to rotate with ratchet 682. With ratchet 682 in the second position, the spring is stretched to bias ratchet 682 towards the first position to facilitate returning ratchet 682 to the first position to disengage ratchet 682 from ratchet wheel 686.

In operation, the user actuates manual release 688 to allow lifting strap 108 to be manually extended. As manual release 688 is actuated, ratchet 682 engages ratchet wheel 686 and rotates ratchet wheel 686 about shaft 630. The rotation of ratchet wheel 686 moves control tang 678 from a first location on a circumferential surface of brake hub 646 or control hub 670 to a second location on the circumferential surface of brake hub 646 or control hub 670 different than the first location, causing wrap spring 672 to unwind and expand in the radial direction to allow drum 628, control hub 670, and wrap spring 672 to rotate with respect to shaft 630 and gear wheel 626. As drum 628, control hub 670, and wrap spring 672 rotate, slack in wrap spring 672 is taken up and control tang 678 is released, which causes wrap spring 672 to tighten again and stop drum 628, control hub 670, and wrap spring 672 from rotating with respect to shaft 630 and gear wheel 626. In contemplated embodiments, lifting strap 108 is manually extendible by 1-8 centimeters (cm) or, more specifically, 2-6 cm, or, even more specifically 3-4 cm, and all subranges therebetween. In a particular embodiment, when manual release 688 is actuated, lifting strap 108 is manually extended at least 3 cm. When manual release 688 is released, ratchet 682 disengages ratchet wheel 686 and the spring urges ratchet 682 back to the first position.

In certain embodiments, one or more circuit boards are operatively coupled to, such as in electrical or electronic communication with, overhead patient lift system 100 to monitor operation of one or more components of overhead patient lift system 100, collect, process, and/or store information, such as lift operation data and motor usage data, and transmit information, such as lift operation data and motor usage data, to one or more of the following computer-implemented machines or devices including, without limitation, a control and/or display device on lift unit 104, a control and/or display device of controller 140, and/or a control and/or display device on a computer or network of computers at one or more nurse stations or administrative stations, for example.

In one embodiment, one or more circuit boards or suitable control panels are contained within lift unit 104 and connected in communication with the movement system of overhead patient lift system 100, such as movement system 120, 220, 320, 420, 520, or 620, and/or the lift unit motor or motor system, such as motor/motor system 124, 324, 424, 524, 624A or 624B. In a particular embodiment, one or more sensors or other suitable detection components are operatively coupled to the movement system, such as movement system 120, 220, 320, 420, 520, or 620, and/or the lift unit motor or motor system, such as motor/motor system 124, 324, 424, 524, 624A or 624B, to detect lift operation and/or motor usage, respectively. The one or more sensors are configured to generate and transmit electronic signals representative of the detected lift operation and/or motor usage to the circuit board, which is configured to collect, process, and/or store such information, and generate and transmit information to one or more computer-implemented machines or devices in communication with the circuit board, as described above.

In certain embodiments, the one or more computer-implemented machines or devices in communication with the circuit board include a controller in signal communication, either wired or wireless signal communication, with the circuit board contained within lift unit 104. The controller includes a suitable display to display information received from the circuit board and/or information generated by the controller based on the information received from the circuit board. In a particular embodiment, the controller is configured to generate command signals and transmit the command signals to the circuit board contained within lift unit 104 to control operation of overhead patient lift system 100 and/or adjust parameters and/or limits, for example, programmed into the circuit board.

Referring to FIGS. 1 and 13-20, in one embodiment controller 140 includes a display 700 configured to display information received from lift unit 104 and/or information generated by controller 140 based on the information received from lift unit 104. FIGS. 13-20 illustrate various screenshots (not all screenshots indicated by an associated reference number in FIGS. 13-20) of display 700 displaying information related to overhead patient lift system 100. In alternative embodiments, display 700 may be configured to display one or more of the screenshots shown in FIGS. 13-20 and/or any suitable additional screenshots.

Referring further to FIGS. 13-20, display 700 may display the total usage of overhead patient lift system 100 or the number of lifts including the number of heavy lifts (lifts of over a threshold weight, such as 200 kilograms) 702, or the number of lifts in the past number of days (such as the past 7 days) 704. Display 700 may display service information including, for example, the days until planned service 706, and the total power consumption 708. Indicators, such as icons including a wrench 710 (FIG. 13), may provide visual alerts. The power consumption may indicate the total number of amp hours including a percentage of amp hours remaining or consumed. Indicators being displayed in specific predefined colors may correspond to specific predetermined events or event types and provide additional alert information. For example, an indicator such as a red-colored icon depicting a motor of the overhead lift may indicate that the motor is past its expected life time. Display 700 may also indicate an overload occurrence and a total number of overload occurrences.

Referring further to FIGS. 17-20, display 700 may display an advance service program 712 for service technicians with authorization, for example, by inputting a password, to access controller 140 to program parameters, limits, and other aspects of or reset overhead patient lift system 100. The technician may, for example, program or reset one or more of the following in advance service program 712: count until next service or maintenance; transfer motor speed (full speed or half-speed); overload counter (number of overloads and/or duty overload); end limits (upper lift limit and lower lift limit); battery change limits (12 months, 15 months, 24 months); and service intervals (12 months, 15 months, 24 months). In addition, advance service program 712 may transfer data between lift unit 104 and controller 140. For example, if the circuit board in lift unit 104 needs replacement, data can be transferred from the circuit board being replaced to controller 140 and then from controller 140 to a new circuit board coupled to lift unit 104.

The above embodiments may be described in terms of functional block components and various processing steps. Such functional blocks may be realized by any number of hardware and/or software components configured to perform the specified functions. For example, embodiments may employ various integrated circuit components, e.g., memory elements, processing elements, logic elements, look-up tables, and the like, which may carry out a variety of functions under the control of one or more processors, microprocessors or other control devices. Similarly, where the elements of the above embodiments are implemented using software programming or software elements the embodiments may be implemented with any programming or scripting language such as C, C++, Java, assembler, or the like, with the various algorithms being implemented with any combination of data structures, objects, processes, routines or other programming elements. Furthermore, the embodiments could employ any number of conventional techniques for electronics configuration, signal processing and/or control, data processing and the like. The word mechanism may be used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." Numerous modifications and adaptations will be readily apparent to those skilled in this art without departing from the spirit and scope of the embodiments.

The order of execution or performance of the operations in embodiments illustrated and described herein is not essential, unless otherwise specified. That is, the operations may be performed in any order, unless otherwise specified, and embodiments as described may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and/or described herein. Other embodiments of the invention may include different computer-executable instructions or components having more or less functionality than illustrated and described herein.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item may include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations may be apparent to those skilled in the art. Also, while multiple inventive aspects and principles may have been presented, they need not be utilized in combination, and various combinations of inventive aspects and principles are possible in light of the various embodiments provided above.

What is claimed is:

1. A method of monitoring operation of one or more components of an overhead patient lift system, said method comprising:
    transmitting electronic data signals, corresponding to the operation of a component of the overhead patient lift system, to a computer in communication with the overhead patient lift system;
    receiving the electronic data signals corresponding to operation of the component of the overhead patient lift system in a processor of the computer;
    processing the electronic signals by the processor of the computer to generate electronic operation data of the component of the overhead patient lift system;
    determining whether maintenance is advised based on the electronic operation data;
    storing the processed electronic operation data of the component of the overhead patient lift system in a non-transient computer readable storage medium in communication with the computer;
    displaying the electronic operation data of the component of the overhead patient lift system on a display device in communication with one or more of the computer and the storage medium; and
    automatically displaying a visual alert on the display device when, based on the electronic operation data, it is determined that maintenance is advised, upon wake-up of the display device.

2. The method of claim 1, wherein the component of the overhead patient lift system is one or more of a lift motor, a motor system, a movement system, and a brake system.

3. The method of claim 1, wherein the transmitting is performed by one or more sensors operatively connected to the component of the overhead patient lift system.

4. The method of claim 1, wherein the electronic operation data generated by the processor includes at least one of lift operation detection data, lift motor usage data, a total usage data of the overhead patient lift system, a cumulative number of lifts made by the overhead patient lift system, a cumulative number of lifts made by the overhead patient lift system that were over a predetermined threshold weight, a cumulative number of lifts made over a specified period of time, lift motor overload occurrence information, service information, and electric power consumption information.

5. The method of claim 1, wherein displaying the electronic operation data of the component of the overhead patient lift system on a display device includes displaying pictographic indicators that are representative of the electronic operation data generated by the processor and provide a visual alert regarding the operation of the overhead patient lift system.

6. The method of claim 1, wherein the display device is one of a display device of the overhead patient lift system and a display device of a remote computer connected to the overhead patient lift system by a computer network.

7. The method of claim 1, wherein the display device of one of a lift unit or a controller of the lift unit of the overhead patient lift system.

* * * * *